United States Patent
Zhou et al.

(10) Patent No.: US 11,837,028 B2
(45) Date of Patent: Dec. 5, 2023

(54) DANCE SEGMENT RECOGNITION METHOD, DANCE SEGMENT RECOGNITION APPARATUS, AND STORAGE MEDIUM

(71) Applicant: NEW ORIENTAL EDUCATION & TECHNOLOGY GROUP INC., Beijing (CN)

(72) Inventors: Mo Zhou, Beijing (CN); Xiwen Yang, Beijing (CN); Wei Qu, Beijing (CN); Qiming Wang, Beijing (CN); Pengshen Zhang, Beijing (CN); Yalong Tong, Beijing (CN)

(73) Assignee: NEW ORIENTAL EDUCATION & TECHNOLOGY GROUP INC., Beijing (CN)

( * ) Notice: Subject to any disclaimer, the term of this patent is extended or adjusted under 35 U.S.C. 154(b) by 0 days.

(21) Appl. No.: 18/044,130

(22) PCT Filed: Sep. 28, 2021

(86) PCT No.: PCT/CN2021/121346
§ 371 (c)(1),
(2) Date: Mar. 6, 2023

(87) PCT Pub. No.: WO2022/068823
PCT Pub. Date: Apr. 7, 2022

(65) Prior Publication Data
US 2023/0260326 A1    Aug. 17, 2023

(30) Foreign Application Priority Data
Sep. 29, 2020    (CN) .......................... 202011052113.8

(51) Int. Cl.
*G06V 40/20* (2022.01)
*G06V 10/82* (2022.01)
*G10L 25/30* (2013.01)

(52) U.S. Cl.
CPC .............. *G06V 40/23* (2022.01); *G06V 10/82* (2022.01); *G10L 25/30* (2013.01)

(58) Field of Classification Search
CPC ......... G06V 40/23; G06V 10/82; G10L 25/30
See application file for complete search history.

(56) References Cited

U.S. PATENT DOCUMENTS

2016/0275355 A1 * 9/2016 Wang ..................... G06V 20/48
2019/0124069 A1   4/2019 Gast
(Continued)

FOREIGN PATENT DOCUMENTS

CN    108665492 A    10/2018
CN    109241909 A    1/2019
(Continued)

OTHER PUBLICATIONS

Bhatt et al., "Neural Network Based Indian Folk Dance Song Classification Using MFCC and LPC", International Journal of Intelligent Engineering & Systems 2017, vol. 10 Issue 3, pp. 173-183, Jun. 30, 2017 (Jun. 30, 2017).

*Primary Examiner* — David F Dunphy
(74) *Attorney, Agent, or Firm* — Bookoff McAndrews, PLLC

(57) ABSTRACT

A dance segment recognition method includes: extracting an audio segment from a video segment in response to the audio segment including a music segment with a time length greater than or equal to a pre-specified time length, using a video sub-segment that is included in the video segment and that corresponds to the music segment as a candidate dance segment and in response to a quantity of image frames showing a dance move in a plurality of image frames of the (Continued)

candidate dance segment being greater than a first pre-specified threshold, determining the candidate dance segment to be a dance segment. The dance segment recognition method can increase the speed of recognizing a dance segment in a video segment.

18 Claims, 10 Drawing Sheets

(56) References Cited

U.S. PATENT DOCUMENTS

| | | | | |
|---|---|---|---|---|
| 2020/0388190 | A1* | 12/2020 | Mochizuki | G06V 20/20 |
| 2022/0080260 | A1* | 3/2022 | Zhang | A63B 24/0006 |

FOREIGN PATENT DOCUMENTS

| | | | |
|---|---|---|---|
| CN | 109618184 | A | 4/2019 |
| CN | 110213670 | A | 9/2019 |
| CN | 110517657 | A | 11/2019 |
| CN | 110853670 | A | 2/2020 |
| CN | 110992449 | A | 4/2020 |
| CN | 111263227 | A | 6/2020 |
| CN | 111563487 | A | 8/2020 |
| CN | 112100436 | A | 12/2020 |
| JP | 2005328329 | A | 11/2005 |
| JP | 2010154342 | A | 7/2010 |
| JP | 2019198074 | A | 11/2019 |
| WO | 2019241785 | A1 | 12/2019 |

\* cited by examiner

DANCE SEGMENT RECOGNITION METHOD, DANCE SEGMENT RECOGNITION APPARATUS, AND STORAGE MEDIUM

CROSS REFERENCE TO RELATED APPLICATIONS

This application is a national stage application of international application no. PCT/CN2021/121346, filed Sep. 28, 2021, which claims priority to Chinese Patent Application No. 202011052113.8, filed on Sep. 29, 2020, which is incorporated herein by reference in its entirety.

TECHNICAL FIELD

Embodiments of the present disclosure relate to a dance segment recognition method, a dance segment recognition apparatus, and a storage medium.

BACKGROUND

Online courses and instruction have become a very common way of teaching nowadays. In online classes for children, teachers often lead students in front of the camera in dancing to the music, sometimes for guiding the students to do physical exercise and sometimes for dance teaching. Students usually enjoy the classes, and it is such a scene of joyfulness. As these video segments (dance segments) not only show the energy of the children, demonstrate the teaching idea of edutainment, and also give full positivity, it is important to find, in videos of online classes for children, segments in which students are dancing to the music. For example, the segments in which students are dancing to the music not only can provide a wonderful short video summary for the classes in which teachers lead the students in dancing that can be used in an official promotional video, and also can be pushed to parents of the students in real time for them to watch the joyful classes of their children.

SUMMARY

At least one embodiment of the present disclosure provides a dance segment recognition method, including: extracting an audio segment from a video segment; in response to the audio segment including a music segment with a time length greater than or equal to a pre-specified time length, using a video sub-segment that is included in the video segment and that corresponds to the music segment as a candidate dance segment; and in response to a quantity of image frames containing a dance move in a plurality of image frames of the candidate dance segment being greater than a first pre-specified threshold, determining the candidate dance segment to be a dance segment.

For example, in at least one example of the dance segment recognition method, the dance segment recognition method further includes: extracting skeleton information from at least some image frames in the plurality of image frames; and obtaining, based on the skeleton information of the at least some image frames, a quantity of image frames showing a dance move in the at least some image frames.

For example, in at least one example of the dance segment recognition method, the obtaining, based on the skeleton information of the at least some image frames, a quantity of image frames showing a dance move in the at least some image frames includes: in response to a variation range of a leg bone in two sequential image frames in the at least some image frames exceeding a pre-specified variation threshold, determining at least one image frame in the two sequential image frames to be an image showing a dance move.

For example, in at least one example of the dance segment recognition method, the method further includes: obtaining, based on the skeleton information in the at least some image frames in the plurality of image frames, a quantity of image frames showing a human who is standing in the at least some image frames; and using the quantity of image frames showing a human who is standing in the at least some image frames as the quantity of image frames showing a dance move in the at least some image frames.

For example, in at least one example of the dance segment recognition method, each of the plurality of image frames includes an information display area and a video display area for an object. The in response to a quantity of image frames containing a dance move in a plurality of image frames of the candidate dance segment being greater than a first pre-specified threshold, determining the candidate dance segment to be a dance segment includes: in response to a quantity of image frames including an information display area of a dance image in the plurality of image frames being greater than the first pre-specified threshold, determining the candidate dance segment to be the dance segment.

For example, in at least one example of the dance segment recognition method, the dance segment recognition method further includes: in response to a quantity of image frames showing a dance move in some of the plurality of image frames being greater than the first pre-specified threshold, stopping detection on the candidate dance segment.

For example, in at least one example of the dance segment recognition method, the dance segment recognition method further includes: dividing the audio segment into a plurality of audio sub-segments; and in response to a first quantity of sequential audio sub-segments in the plurality of audio sub-segments all being determined to be music sub-segments, determining a combination of the first quantity of the sequential audio sub-segments to be at least a part of the music segment. The first quantity is an integer not less than 3.

For example, in at least one example of the dance segment recognition method, the dance segment recognition method further includes: extracting a first feature vector of each of at least some audio sub-segments in the plurality of audio sub-segments by using a first music recognition model; cutting each of the at least some audio sub-segments in the plurality of audio sub-segments into a second quantity of subdivided audio sub-segments, and extracting a second feature vector of each of the second quantity of subdivided audio sub-segments by using the second music recognition model; concatenating the first feature vector and the second quantity of second feature vectors that correspond to a same audio sub-segment to obtain a concatenated feature vector corresponding to the same audio sub-segment; and providing the concatenated feature vector corresponding to the same audio sub-segment to a third music recognition model to determine whether the same audio sub-segment is a music sub-segment by using the third music recognition model.

For example, in at least one example of the dance segment recognition method, the first music recognition model is a first neural network and is configured to output the first feature vector; the second music recognition model is a second neural network and is configured to output the second feature vector; and the third music recognition model is configured to receive the concatenated feature vector.

For example, in at least one example of the dance segment recognition method, where a product of a dimension of the second feature vector and the second quantity is equal to a dimension of the first feature vector; and a dimension of the concatenated feature vector is two times the dimension of the first feature vector.

For example, in at least one example of the dance segment recognition method, the dance segment recognition method includes: using a first set of audio segments to train the first neural network, and using the trained first neural network as the first music recognition model; using a second set of audio segments to train the second neural network, and using the trained second neural network as the second music recognition model; and training a third neural network based on a third set of audio segments, the first music recognition model, and the second music recognition model, and using the trained third neural network as the third music recognition model. A time length of each audio segment in the first set of audio segments and the third set of audio segments is a first time length, a time length of each audio segment in the second set of audio segments is a second time length, and the second time length is less than the first time length.

For example, in at least one example of the dance segment recognition method, the training a third neural network based on a third set of audio segments, the first music recognition model, and the second music recognition model includes: extracting a first training feature vector of each audio segment in the third set of audio segments based on the first music recognition model; dividing each audio segment in the third set of audio segments into a pre-specified quantity of audio sub-segments; extracting a second training feature vector of each of the pre-specified quantity of audio sub-segments based on the second music recognition model; concatenating the first training feature vector and the second training feature vector to obtain a concatenated training feature vector; and providing the concatenated training feature vector to the third neural network, and adjusting a parameter of the third neural network based on an output value of the third neural network to minimize a loss function.

For example, in at least one example of the dance segment recognition method, the providing the concatenated training feature vector to the third neural network, and adjusting a parameter of the third neural network based on an output value of the third neural network to minimize a loss function includes: providing the concatenated training feature vector to the third neural network; and adjusting the parameter of the third neural network based on the output value of the third neural network to minimize the loss function.

For example, in at least one example of the dance segment recognition method, the dance segment recognition method further includes: obtaining an audio positive sample and an audio negative sample; and creating the first set of audio segments, the second set of audio segments, and the third set of audio segments based on at least a part of the audio positive sample and at least a part of the audio negative sample.

For example, in at least one example of the dance segment recognition method, the obtaining an audio positive sample and an audio negative sample includes: finding out a candidate positive sample and a candidate negative sample in a plurality of sample audio segments by using a fourth music recognition model; and using at least a part of the candidate positive sample as at least the part of the audio positive sample, and using at least a part of the candidate negative sample as at least the part of the audio negative sample.

For example, in at least one example of the dance segment recognition method, the obtaining an audio positive sample and an audio negative sample further includes: using a positive sample and a negative sample that are calibrated by man as at least the part of the obtained audio positive sample and at least the part of the obtained audio negative sample respectively.

For example, in at least one example of the dance segment recognition method, the obtaining an audio positive sample and an audio negative sample includes: using an electronic noise segment as at least the part of the audio negative sample.

At least one embodiment of the present disclosure further provides a storage medium. The storage medium stores a computer program instruction, and when the computer program instruction is executed by a processor, a computer is enabled to perform the following method, including: extracting an audio segment from a video segment; in response to the audio segment including a music segment with a time length greater than or equal to a pre-specified time length, using a video sub-segment that is included in the video segment and that corresponds to the music segment as a candidate dance segment; and in response to a quantity of image frames containing a dance move in a plurality of image frames of the candidate dance segment being greater than a first pre-specified threshold, determining the candidate dance segment to be a dance segment.

At least one embodiment of the present disclosure further provides a dance segment recognition apparatus, including a processor and a memory. The memory stores a computer program instruction adaptable to be executed by the processor, and when the computer program instruction is executed by the processor, the processor is enabled to perform the following method: extracting an audio segment from a video segment; in response to the audio segment including a music segment with a time length greater than or equal to a pre-specified time length, using a video sub-segment that is included in the video segment and that corresponds to the music segment as a candidate dance segment; and in response to a quantity of image frames containing a dance move in a plurality of image frames of the candidate dance segment being greater than a first pre-specified threshold, determining the candidate dance segment to be a dance segment.

At least one embodiment of the present disclosure further provides a dance segment recognition apparatus, including an audio segment extracting module, a candidate dance segment determining module, and a dance segment determining module. The audio segment extracting module is configured to extract an audio segment from a video segment; the candidate dance segment determining module is configured to: in response to the audio segment including a music segment with a time length greater than or equal to a pre-specified time length, use a video sub-segment that is included in the video segment and that corresponds to the music segment as a candidate dance segment; and the dance segment determining module is configured to: in response to a quantity of image frames containing a dance move in a plurality of image frames of the candidate dance segment being greater than a first pre-specified threshold, determine the candidate dance segment to be a dance segment.

At least one embodiment of the present disclosure further provides a method for training a neural network for determining a music segment. The method includes: using a first set of audio segments to train a first neural network, and using the trained first neural network as a first music recognition model; using a second set of audio segments to train a second neural network, and using the trained second neural network as a second music recognition model; and training a third neural network based on a third set of audio segments, the first music recognition model, and the second music recognition model, and using the trained third neural network as a third music recognition model. A time length of each audio segment in the first set of audio segments and the third set of audio segments is a first time length, a time length of each audio segment in the second set of audio segments is a second time length, and the second time length is less than the first time length.

For example, in at least one example of the training method, the training a third neural network based on a third set of audio segments, the first music recognition model, and the second music recognition model includes: extracting a first training feature vector of each audio segment in the third set of audio segments based on the first music recognition model; dividing each audio segment in the third set of audio segments into a pre-specified quantity of audio sub-segments; extracting a second training feature vector of each of the pre-specified quantity of audio sub-segments based on the second music recognition model; concatenating the first training feature vector and the second training feature vector to obtain a concatenated training feature vector; and providing the concatenated training feature vector to the third neural network, and adjusting a parameter of the third neural network based on an output value of the third neural network to minimize a loss function.

For example, in at least one example of the training method, the providing the concatenated training feature vector to the third neural network, and adjusting a parameter of the third neural network based on an output value of the third neural network to minimize a loss function includes: providing the concatenated training feature vector to the third neural network; and adjusting the parameter of the third neural network based on the output value of the third neural network to minimize the loss function.

For example, in at least one example of the training method, the training method further includes: obtaining an audio positive sample and an audio negative sample; and creating the first set of audio segments, the second set of audio segments, and the third set of audio segments based on at least a part of the audio positive sample and at least a part of the audio negative sample.

For example, in at least one example of the training method, the obtaining an audio positive sample and an audio negative sample includes: finding out a candidate positive sample and a candidate negative sample in a plurality of sample audio segments by using a fourth music recognition model; and using at least a part of the candidate positive sample as at least the part of the audio positive sample, and using at least a part of the candidate negative sample as at least the part of the audio negative sample.

For example, in at least one example of the training method, the obtaining an audio positive sample and an audio negative sample further includes: using a positive sample and a negative sample that are calibrated by man as at least the part of the obtained audio positive sample and at least the part of the obtained audio negative sample respectively.

For example, in at least one example of the training method, the obtaining an audio positive sample and an audio negative sample includes: using an electronic noise segment as at least the part of the audio negative sample.

BRIEF DESCRIPTION OF THE DRAWINGS

To describe technical solutions in embodiments of the present disclosure more clearly, the following briefly describes the accompanying drawings for the embodiments. Apparently, the accompanying drawings in the following description show merely some embodiments of the present disclosure but not to limit the present disclosure.

DETAILED DESCRIPTION

To make the objectives, technical solutions, and advantages of the present disclosure clearer, the following clearly and completely describes the technical solutions of in the embodiments of the present disclosure in conjunction with the accompanying drawings for the embodiments of the present disclosure. Clearly, the described embodiments are some rather than all of the embodiments of the present disclosure. All other embodiments obtained by those of ordinary skill in the art based on the described embodiments of the present disclosure without creative efforts shall fall within the protection scope of the present disclosure.

Unless otherwise defined, the technical terms or scientific terms used herein shall have meaning usually understood by those of ordinary skills in the field to which the present disclosure belongs. Words like "first" and "second" used in the present disclosure does not indicate any sequence, number, or importance but is used to distinguish different integrants. Similarly, "include/comprise", "contain", or a similar word means that an element or item before the word covers an element, an item, or an equivalent thereof enlisted after the word and does not exclude other elements or items. "Connection", "connected", or a similar word is not limited to a physical or mechanical connection, but may include a direct or indirect electrical connection. "Above", "beneath", "left", "right", and the like are merely used to represent a relative location relationship, and when an absolute location of an object that is being described changes, the relative location relationship may also change accordingly.

Mainly with a local receptive field (also referred to as a receptive field or sensory space) and weight sharing, a convolutional neural network (CNN) reduces the complexity of a neural network model and achieve fewer weights. The application of CNNs is already not limited to the field of image recognition, but CNNs can also be applied to the field of audio recognition.

A convolutional neural network needs to be trained before the convolutional neural network is used for audio processing. After being trained, a related parameter of the convolutional neural network remains unchanged during the audio processing. During the training process, a related parameter (for example, a weight of a convolution kernel) of the convolutional neural network may be adjusted to decrease the loss of the neural network to a maximum degree (that is, to minimize the loss function), and an optimized parameter (for example, an optimal weight) may be obtained.

Figure 1:
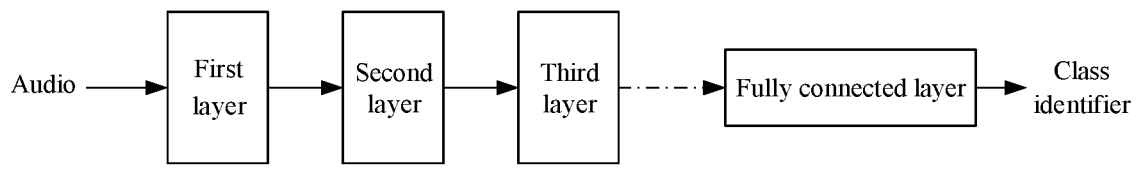
FIG. 1 is a schematic diagram of a structure of a convolutional neural network.

FIG. 1 is a schematic diagram of a structure of a convolutional neural network. For example, as shown in FIG. 1, the convolutional neural network includes a first layer, a second layer, a third layer, a fully connected layer, etc. For example, as shown in FIG. 1, after input audio is input to the convolutional neural network via an input layer, a class identifier (for example, a music segment or a non-music segment) is output after several processes (for example, the first layer, the second layer, and the third layer in FIG. 1) successively.

It should be noted that, although FIG. 1 shows that the convolutional neural network includes only three layers (namely, the first layer, the second layer, and the third layer), the embodiments of the present disclosure are not limited to this case. For example, the convolutional neural network may alternatively include two layers, four layers, or another suitable quantity of layers.

For example, each of the first layer, the second layer, and the third layer may include one convolution module and one down sampling layer, that is, the main parts of the convolutional neural network may include a plurality of convolutional layers, a plurality of down sampling layers, and the fully connected layer. For example, processes in each layer may include: performing convolution on the input audio, and perform down-sampling (sub-sampling/down-sampling).

For example, the convolutional layer is the kernel layer of the convolutional neural network. In the convolutional layer of the convolutional neural network, one neuron is connected to only neurons at a part of adjacent layers. For example, in the convolutional layer, several convolution kernels (also referred to as filters) of different sizes (kernel sizes, or receptive fields) may be applied to the input audio, to extract features of a plurality of types of the input audio. For example, each convolution kernel may extract a feature of one type. Generally, a convolution kernel is initialized in the form of a random decimal matrix, and during the training process of a convolutional neural network, the convolution kernel obtains a sensible weight through learning. For example, after one convolution kernel is applied to input audio, an obtained result is referred to as a feature map (feature map), and a quantity of feature maps is equal to a quantity of convolution kernels. A weight is shared between neurons in the same feature map, and the shared weight is a convolution kernel. A feature map output by a convolutional layer in one layer may be input to a convolutional layer in a next layer for re-processing to obtain a new feature map. For example, a convolutional layer in the first layer may output a first feature map, and the first feature map is input to a convolutional layer in the second layer for re-processing to obtain a second feature map. For example, a convolutional layer may use different convolution kernels for convolution on data in a local receptive field of input audio.

For example, at least a part (for example, each) of the first layer, the second layer, and the third layer may further include an activation layer. For example, the activation layer is configured for preventing the vanishing gradient problem. For example, the activation layer may receive a convolution result from a convolutional layer in the same layer, and calculation is performed in the activation layer based on a corresponding activation function to obtain feature information of input audio.

For example, a down sampling layer may be set between adjacent convolutional layers, where a down sampling layer is a form of down sampling. In one hand, the down sampling layer may be used to downsize input audio and reduce the complexity of calculation, such that overfitting can be reduced to some degree, in the other hand, the down sampling layer may further perform feature extraction to extract key features of the input audio. The down sampling layer can downsize a feature map but keep a quantity of the feature maps unchanged. For example, the down sampling layer may receive data from a convolutional layer in the same layer in which the down sampling layer is located (where the same layer does not include an activation layer) or an activation layer in the same layer in which the down sampling layer is located (where the same layer includes an activation layer). For example, the down sampling layer may be used to decrease a quantity of parameters and extract information from higher layers. For example, in a case in which a receptive field (kernel size) remains unchanged, a feature that is more global may be obtained by setting a down sampling layer. For example, at least a part of the first layer, the second layer, and the third layer may alternatively not include a down sampling layer.

For example, a last down sampling layer or convolutional layer of a convolutional neural network may be connected to one or more fully connected layers. The fully connected layer is used to connect a feature extracted form an upper layer of the fully connected layer and project the feature extracted form an upper layer of the fully connected layer to a pre-specified dimension; and a last fully connected layer of the convolutional neural network is configured to output one one-dimensional matrix, where each element in the one-dimensional matrix is used to represent a probability of a sample being a pre-specified class. For example, for each audio sample, an output of the last fully connected layer of the convolutional neural network may be [a, b]. Herein, a is a probability of the audio sample being a music segment, and b is a probability of the audio sample being a non-music segment.

For example, a softmax function may be used for performing the softmax operation on the output (for example, the one-dimensional matrix) of the last fully connected layer of the convolutional neural network, such that a predicted probability of each pre-specified class remain between 0 and 1, and a sum of predicted probabilities of various pre-specified classes is 1. For example, it may be that after the softmax operation is performed on the output (for example, [a, b]) of the last fully connected layer of the convolutional neural network by using the softmax function, the softmax function outputs a one-dimensional matrix [a1, b1], where a1 is a probability of the audio sample being a music segment, b1 is a probability of the audio sample being a non-music segment, and a1 and b1 satisfy the following expression: a1+b1=1, where $0 \leq a1 \leq 1$; and $0 \leq b1 \leq 1$. For example, the softmax operation may also be referred to as a softmax layer. For example, the softmax layer is used for a classification process.

For example, during the building and training of a neural network, a strategy of dropout (dropout refers to a strategy of randomly removing some features in the fully connected layer) may be applied to prevent overfitting and thus further avoid that the trained neural network can only be used to detect a sample that is of a similar or same type of a calibrated sample. For example, during the building and training of a neural network, a strategy of learning rate decay (that is, to reduce a learning rate of the neural network from a larger value to a smaller value during the training of the neural network) may be applied to find a globally optimal parameter (for example, a globally optimal weight) as quickly as possible. For example, during the building and training of a neural network, a strategy of label smoothing may be applied to improve generalization of the trained neural network and reduce a time for training the neural network or improve accuracy of the trained neural network.

The inventor of the present disclosure finds during research that currently a dance segment (a video sub-segment including music and dance, for example, a video segment showing students dancing to the music) in a video (for example, a video of an online class for children) is usually searched with a manual process, and the dance segment is obtained from the video with a manual process as well. However, this method not only takes much time and effort (that is, is of low efficiency and high costs) but may also cause an undetected error (for example, a low recall rate) when there are a relatively large quantity of videos (for example, a huge quantity of videos of online classes for children) as it is difficult for any person to watch all videos.

At least one embodiment of the present disclosure provides a dance segment recognition method, a dance segment recognition apparatus, a method for training a neural network for determining a music segment, and a storage medium. The dance segment recognition method includes: extracting an audio segment from a video segment; in response to the audio segment including a music segment with a time length greater than or equal to a pre-specified time length, using a video sub-segment that is included in the video segment and that corresponds to the music segment as a candidate dance segment; and in response to a quantity of image frames showing a dance move in a plurality of image frames of the candidate dance segment being greater than a first pre-specified threshold, determining the candidate dance segment to be a dance segment.

For example, the dance segment recognition method may be used to recognize a dance segment (a video sub-segment including music and dance) in an online class video. For example, the dance segment recognition method can not only increase the speed of recognizing a dance segment in a video segment.

It should be noted that, for the ease of description, at least one embodiment of the present disclosure uses an example in which a video segment is a video segment included in an online class video for description, but the at least one embodiment of the present disclosure is not limited to this. For example, in a case in which a video segment is a video segment included in an offline class video, the dance segment recognition method provided in the at least one embodiment of the present disclosure can also be used to increase the speed of recognizing a dance segment in a video segment.

For example, the dance segment recognition method and the method for training a neural network for determining a music segment may be implemented based on a server (for example, back-end).

Non-limitative description of the dance segment recognition method provided in the at least one embodiment of the present disclosure is provided below by several examples and embodiments. As described below, in a case in which there is no mutual contradiction, different features in these specific examples and embodiments may combine with each other to obtain new examples and embodiments, and these new examples and embodiments also fall within the protection scope of the present disclosure.

Figure 2:
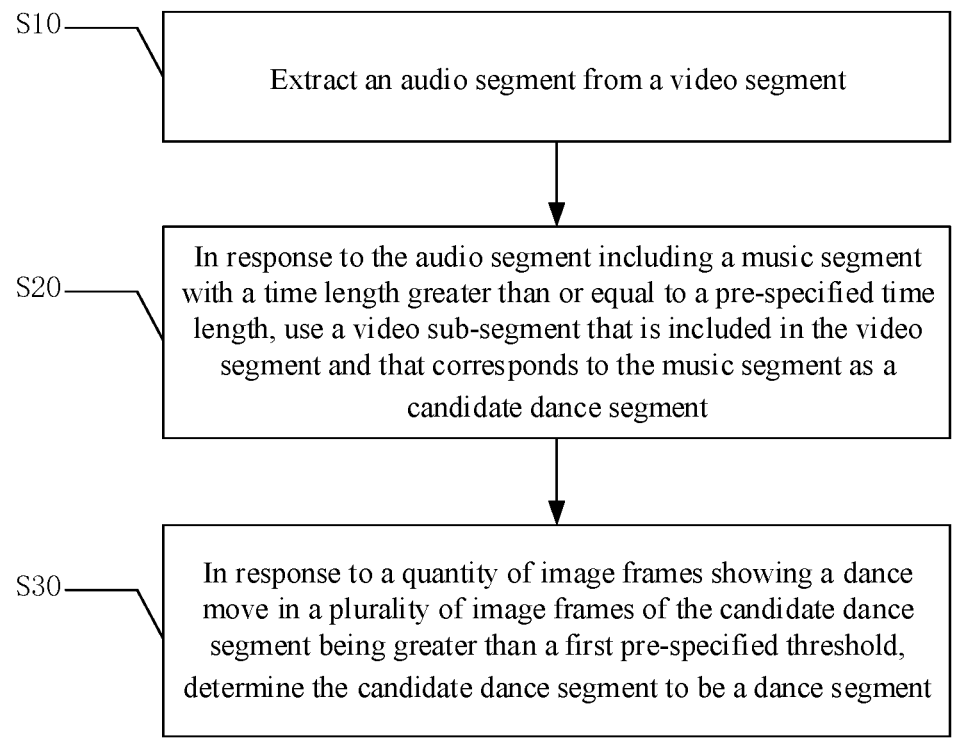
FIG. 2 is a schematic flowchart of a dance segment recognition method according to at least one embodiment of the present disclosure.

FIG. 2 is a schematic flowchart of a dance segment recognition method according to at least one embodiment of the present disclosure. As shown in FIG. 2, the dance segment recognition method includes the following step S10 to step S30.

Step S10: Extract an audio segment from a video segment.

Step S20: In response to the audio segment including a music segment with a time length greater than or equal to a pre-specified time length, use a video sub-segment that is included in the video segment and that corresponds to the music segment as a candidate dance segment.

Step S30: In response to a quantity of image frames showing a dance move in a plurality of image frames of the candidate dance segment being greater than a first pre-specified threshold, determine the candidate dance segment to be a dance segment.

For example, in at least one embodiment of the present disclosure, the candidate dance segment is obtained by determining whether the audio segment included in the video segment includes the music segment with a time length greater than or equal to the pre-specified time length, and then in response to the quantity of image frames showing a dance move in the plurality of image frames of the candidate dance segment being greater than the first pre-specified threshold, the candidate dance segment is determined to be a dance segment (a video sub-segment including the music segment with a time length greater than or equal to the pre-specified time length). In this case, a speed and accuracy of recognizing a dance segment can be enhanced for the following reasons. Firstly, a speed of recognizing a music segment (a speed of recognizing a music segment directly) is greater than a speed of recognizing a dance segment (a speed of recognizing a dance segment directly), and an accuracy of recognizing a music segment is higher than an accuracy of recognizing a dance segment. Secondly, by determining that the audio segment included in the video segment does not include the music segment with a time length greater than or equal to the pre-specified time length, that the video segment does not include a dance segment can be directly and quickly determined, without the need to detect whether an image included in the video segment includes a dance move.

For example, the dance segment recognition method provided in the at least one embodiment of the present disclosure is especially suitable for being used to recognize a dance segment included in an online class video, because audio segments from most of a plurality of video segments included in an online class video are not music segments. Therefore, for each video segment in most of a plurality of video segments included in an online class video, detection on the video segment may be stopped after step S20 is performed, without the need to detect whether the video segment shows a dance move (for example, by performing step S30 and another related step), such that a speed and accuracy of the recognition can be enhanced.

For example, step S10, step S20, and step S30 may be performed sequentially.

For example, in step S10, a video segment may be a video segment included in an online class video. For example, each (for example, a class video corresponding to one class, where one class may have, for example, a part for learning and a part for taking a rest) of a plurality of online class videos may be cut into a plurality of video segments; and the dance segment recognition method provided in the at least one embodiment of the present disclosure may be performed on each of the plurality of video segments included in each online class video.

For example, when cutting each online class video, it may be ensured that at least some (for example, each) of the plurality of video segments included in each online class video have a time length that is a first time length t1. For example, in a case in which a quantity of the plurality of video segments included in each online class video is m, it may be ensured that m−1 or m video segments has/have a time length that is the first time length t1. For example, a value of the first time length t1 may be set based on actual application requirements, and this is not limited in the at least one embodiment of the present disclosure. For example, the first time length t1 may be equal to 60 seconds or another suitable numerical value (for example, 120 seconds or 240 seconds). For example, the plurality of video segments included in each online class video may be transmitted in the form of a message queue. For example, the plurality of video segments included in each online class video may be uploaded to a cloud server or a database.

For example, in step S10, the video segment includes a plurality of images arranged by time (for example, an image stream) and audio segments corresponding to the plurality of images arranged by time. The plurality of images arranged by time and the audio segments are aligned with each other. Herein, that "the plurality of images arranged by time and the audio segments are aligned with each other" means that at any time point during the playing of the video segment, a time point at which an image that is being displayed is captured is the same as a time point at which the sound that is being played is recorded. For example, a frame rate (frame rate) of the video segment refers to a quantity of images (for example, a static picture) of the video segment that are displayed every second.

For example, in step S10, a method for extracting an audio segment from a video segment may refer to a related technology. Details are not provided herein.

For example, the plurality of image frames of the candidate dance segment refer to a plurality of image frames that are included in the candidate dance segment and that are to be detected. In step S30, for example, the plurality of image frames of the candidate dance segment may be all images included in the candidate dance segment; or for another example, the plurality of image frames of the candidate dance segment may be a plurality of image frames extracted from the candidate dance segment at pre-specified time intervals (for example, 1 second or 0.1 second), where in this case, a quantity of images that need to be detected and a time for detecting can be reduced. For example, one image frame may be extracted from the candidate dance segment every two seconds and used as a part of the plurality of image frames. For example, in a case in which a frame rate (Frame rate) of the candidate dance segment is 120 Hz and a time length thereof is 60 seconds, if a plurality of images are obtained by extracting one image frame from the candidate dance segment every two seconds, a quantity of the plurality of image frames is 60.

For example, in step S30, the first pre-specified threshold may be set based on practical experience. For example, after a method for determining a dance segment (for example, a method for determining whether an image shows a dance move) is determined, the first pre-specified threshold may be adjusted to ensure determined performance of the dance segment satisfies a pre-specified requirement (for example, an accuracy is greater than or equal to a pre-specified accuracy threshold, or a time for determining is less than or equal to a pre-specified time threshold). For example, the first pre-specified threshold is any numerical value less than or equal to n and greater than or equal to n/4. For example, the first pre-specified threshold may be n/3, n/2, or any other suitable numerical value. Through actual tests, the inventor of the present disclosure notices that setting the first pre-specified threshold to n/3 can minimize a time for determining a dance segment with an accuracy greater than or equal to a pre-specified accuracy threshold.

For example, a specific implementation of step S30 may be specified based on actual application requirements.

In one example, whether each of the plurality of image frames included in the candidate dance segment shows a dance move may be determined (that is, whether each of the plurality of image frames that are included in the candidate dance segment and that are to be detected shows a dance move is determined) at first to determine a quantity of images showing a dance move in the plurality of image frames (namely, the plurality of image frames that are to be detected), and then whether the quantity of images showing a dance move in the plurality of image frames is greater than the first pre-specified threshold. In a case in which the quantity of images showing a dance move in the plurality of image frames is greater than the first pre-specified threshold, the candidate dance segment is determined to be a dance segment, such that a dance segment is recognized and extracted from a video segment.

In another example, the dance segment recognition method further includes: in response to a quantity of image frames showing a dance move in some of the plurality of image frames (namely, the plurality of image frames that are to be detected) being greater than the first pre-specified threshold, stopping detection on the candidate dance segment. For example, in a case in which the quantity of image frames showing a dance move in some of the plurality of image frames being greater than the first pre-specified threshold, no matter whether an not-detected image in the plurality of image frames shows a dance move, it can be determined that the quantity of image frames showing a dance move in the plurality of image frames is greater than the first pre-specified threshold. Therefore, detection on the candidate dance segment can be stopped when it is determined that the quantity of images showing a dance move in some of the plurality of image frames included in the candidate dance segment is greater than the first pre-specified threshold. In this case, for some video segments, detection may be performed on only some of the plurality of image frames included in the candidate dance segment, such that efficiency of determining a candidate dance segment can be improved and a time for recognizing a dance segment in a video segment can be reduced.

For example, a method for obtaining the quantity of image frames showing a dance move in some of the plurality of image frames (for example, for detecting dance) may be specified based on actual application requirements.

In the first example, the quantity of image frames showing a dance move in some of the plurality of image frames may be obtained by extracting human skeleton information.

For example, in addition to step S10 to step S30, the dance segment recognition method further includes the following step S41 and step S42.

Step S41: Extract skeleton information from at least some image frames in the plurality of image frames.

Step S42: Obtain, based on the skeleton information of the at least some image frames, a quantity of image frames showing a dance move in the at least some image frames.

For example, step S41 and step S42 may be performed sequentially. For example, step S41 and step S42 may be performed after step S10 and step S20 are performed but before step S30 is performed. For another example, step S41 and step S42 may be performed when step S30 is performed after step S10 and step S20 are performed.

For example, in step S41, skeleton information in an image refers to information about skeleton of a human body in the image. For example, a human body in at least one embodiment of the present disclosure may refer to a real human body or a cartoon figure. For example, a human body in at least one embodiment of the present disclosure has a head, a body, shoulders, upper arms, forearms, hands, thighs, calves, and feet.

For example, in step S41, skeleton information in each of at least some of the plurality of image frames may be obtained by extracting a coordinate of a keypoint (for example, a joint) of a human body from each of some of the plurality of image frames.

Figure 3:
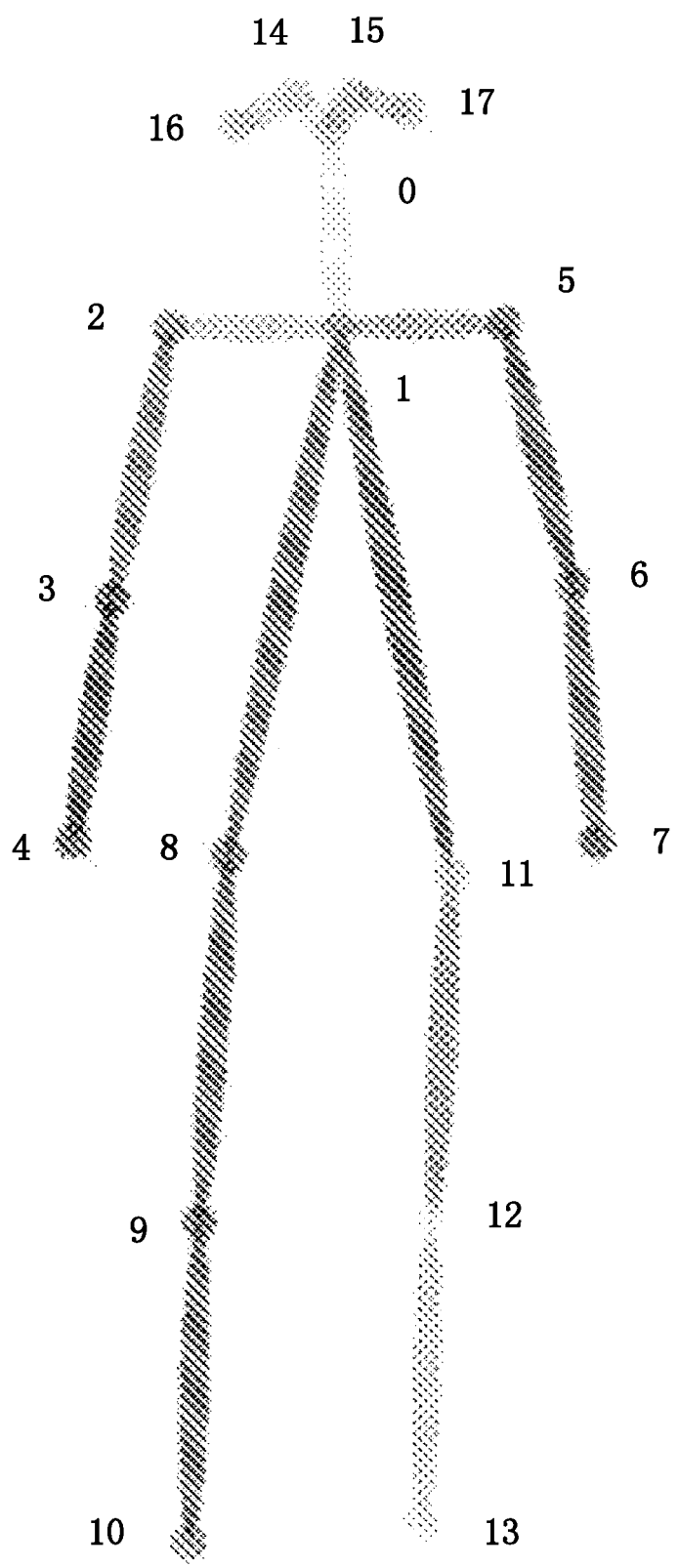
FIG. 3 is a schematic diagram of keypoints of a human body.

For example, the keypoint of a human body needed to be extracted may be determined based on actual application requirements. FIG. 3 is a schematic diagram of keypoints of a human body. For example, as shown in FIG. 3, keypoints of a human body include at least one of joints and facial keypoints. For example, as shown in FIG. 3, joints of a human body include shoulder joints (for example, 2 and 5 in FIG. 3), elbow joints (for example, 3 and 6 in FIG. 3), wrist joints (for example, 4 and 7 in FIG. 3), hip joints (for example, 8 and 11 in FIG. 3), knee joints (for example, 9 and 12 in FIG. 3), ankle joints (for example, 10 and 13 in FIG. 3), and the neck (for example, 1 in FIG. 3, a part connecting the neck with the body). For example, as shown in FIG. 3, facial keypoints of a human body may include the nose (for example, 0 in FIG. 3), the eyes (for example, 14 and 15 in FIG. 3), and the ears (for example, 16 and 17 in FIG. 3). In some examples, keypoints of a human body may alternatively include only joints.

For example, after a coordinate of a keypoint of a human body in an image is obtained, skeleton information of the human body in the image may be obtained. For example, after coordinates of a shoulder joint, elbow joint, and a wrist joint are obtained, skeleton information of an upper arm may be obtained based on the coordinates of the shoulder joint and the elbow joint; and skeleton information of a forearm may be obtained based on the coordinates of the elbow joint and the wrist joint. For example, after coordinates of a hip joint, knee joint, and an ankle joint are obtained, skeleton information of a thigh may be obtained based on the coordinates of the hip joint and the knee joint; and skeleton information of a calf may be obtained based on the coordinates of the knee joint and the ankle joint.

For example, open-source software, for example, Open-Pose, or another suitable method, may be used to extract the skeleton information in each of at least some of the plurality of image frames.

For example, step S42 includes the following step S426.

Step S426: In response to a variation range of a leg bone in two sequential image frames in the at least some image frames exceeding a pre-specified variation threshold, determine at least one image frame in the two sequential image frames to be an image showing a dance move.

For example, in step S426, in response to the variation range of a leg bone in the two sequential image frames in the at least some image frames exceeding the pre-specified variation threshold, one image frame that is earlier than the other in the two sequential image frames may be determined to be an image showing a dance move, or both of the sequential image frames may be determined to be images showing a dance move.

For example, the variation range of a leg bone (for example, at least one of a calf bone and a thigh bone) in the two sequential image frames may include at least one of a location variation range and an angle variation range. For example, the variation range of a leg bone in the two sequential image frames exceeding the pre-specified variation threshold may mean at least one of a location variation range of a leg bone in the two sequential image frames exceeding a pre-specified location variation threshold and an angle variation range of a leg bone in the two sequential image frames exceeding a pre-specified angle variation threshold.

In another example, step S42 includes the following step S421 and step S422. For example, step S421 and step S422 may be performed sequentially.

Step S421: Obtain, based on the skeleton information of the at least some image frames, a quantity of image frames showing a human who is standing in the at least some image frames.

Step S422: Use the quantity of image frames showing a human who is standing in the at least some image frames as the quantity of image frames showing a dance move in the at least some image frames.

For example, in step S421, whether a human who is standing is included in an image may be determined based on whether a ratio of a height of the shoulder of a human to a width of the shoulder of the human is within a first numerical value range. For example, when a human is standing upright, a height of the shoulder is substantially equal to a sum of a length of the human body and a length of the lower limbs (a length of the calves plus a length of the thighs). For example, the first numerical value range may be set based on actual application requirements. For example, the first numerical value range may be between 3 and 5 (for example, 3.5 to 4.5). For example, by determining whether a human who is standing is included in an image based on a ratio of a height of the shoulder of a human to a width of the shoulder of the human, computation for determining whether a human who is standing is included in an image and a time for determining can be reduced, such that efficiency of the dance segment recognition method can be improved.

In the second example, the quantity of image frames showing a human who is standing in the at least some of the plurality of image frames of the candidate dance segment may be used as the quantity of image frames showing a dance move in the at least some image frames, and in this case, in addition to step S10 to step S30, the dance segment recognition method further includes the following step S46 and step S47.

Step S46: Obtain a quantity of image frames showing a human who is standing in the at least some image frames.

Step S47: Use the quantity of image frames showing a human who is standing in the at least some image frames as the quantity of image frames showing a dance move in the at least some image frames.

For example, step S46 and step S47 may be performed sequentially. For example, step S46 and step S47 may be performed sequentially. For example, step S46 and step S47 may be performed after step S10 and step S20 are performed but before step S30 is performed. For another example, step S46 and step S47 may be performed when step S30 is performed after step S10 and step S20 are performed.

For example, in step S46, that the quantity of image frames showing a human who is standing in the at least some image frames is obtained includes: performing the following step S461 to step S463 for each of at least some of the plurality of image frames of the candidate dance segment. For example, step S461 to step S463 may be performed in this sequence: step S461, step S462, step S463.

Step S461: Detect, by using a model (human detection model) for detecting a human (for example, a human body), whether each of at least some of the plurality of image frames of the candidate dance segment includes a human, and in a case in which each of at least some of the plurality of image frames of the candidate dance segment includes a human, generate a human detection box for marking out the human in each of at least some of the plurality of image frames of the candidate dance segment (if the image includes a human). For example, in a case in which the image does not include a human, it is determined that the image frame does not include a human who is standing.

For example, in step S461, a method for detecting, by using a model for detecting a human (human detection model), whether an image includes a human and generating a human detection box for marking out a human in the image may refer to a related technology. Details are not provided herein.

For example, the human detection box is rectangular. For example, the human detection box is a rectangle of a minimal size (both a length and a width of the rectangle are minimal) that can mark out a corresponding human.

Step S462: Calculate a length-width ratio of the human detection box.

Step S463: Determine, based on the length-width ratio of the human detection box, whether each of at least some of the plurality of image frames of the candidate dance segment includes a human who is standing.

For example, in step S463, that whether each of the at least some of the plurality of image frames of the candidate dance segment includes a human who is standing is determined based on the length-width ratio of the human detection box includes: in a case in which a length-width ratio of a human detection box with a maximum length-width ratio in an image frame is greater than a first threshold, determining that the image including the human detection box with the maximum length-width ratio includes a human who is standing; or in a case in which a length-width ratio of a human detection box with a maximum length-width ratio in an image frame is less than or equal to a first threshold, determining that the image including the human detection box does not include a human who is standing.

For example, the first threshold may be set based on actual application requirements. For example, the first threshold may be between 1.5 and 1.9 (for example, 1.65, 1.7, or 1.75).

For example, by determining, based on the length-width ratio of the human detection box, whether each of the at least some of the plurality of image frames of the candidate dance segment includes a human who is standing, development effort can be reduced and a detection speed can be increased while using a human detection model and a human detection method in a related technology.

For another example, in step S46, that the quantity of image frames showing a human who is standing in the at least some image frames is obtained includes: for each of the at least some of the plurality of image frames (for example, a plurality of image frames that are to be detected) of the candidate dance segment, extracting skeleton information from the at least some of the plurality of image frames, and determining, based on the skeleton information of the at least some of the plurality of image frames, whether each of the at least some image frames includes a human who is standing. A specific method is similar to step S421 and step S422, and details are not provided herein again.

Figure 4:
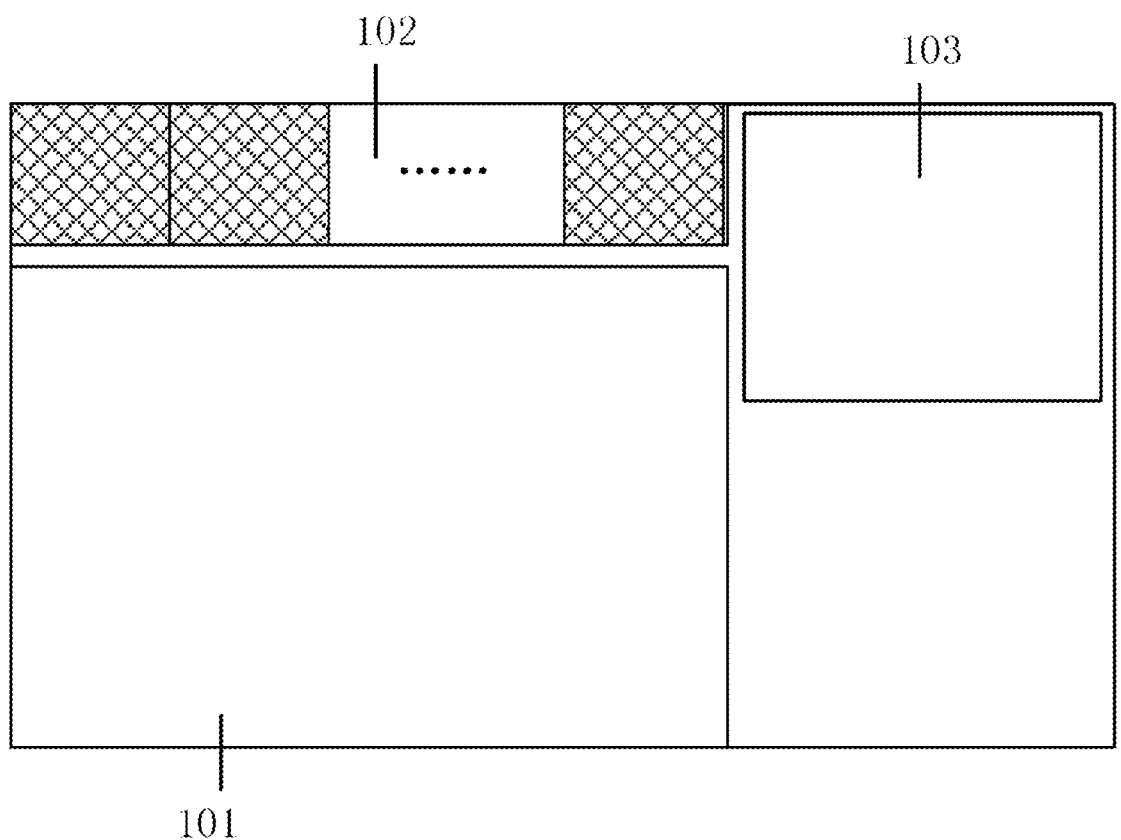
FIG. 4 is a schematic diagram of each image frame of a video segment according to at least one embodiment of the present disclosure.

For example, each of the plurality of image frames includes an information display area 101 and a video display area 102 for an object. FIG. 4 is a schematic diagram of each image frame of a video segment according to at least one embodiment of the present disclosure. For example, as shown in FIG. 4, each image frame of the video segment includes an information display area 101 and a video display area 102 for an object. For example, the video display area 102 for an object is used to display a video showing a student (for example, a plurality of students) in an online class. For example, as shown in FIG. 4, the video display area 102 for an object may include a plurality of video display sub-areas for an object, so that the video display area 102 for an object can display a video showing a plurality of students in the online class. For example, the information display area 101 is used to display information about the online class to a student in the online class. For example, the information about the online class includes a PPT for the class and a video for dance leading during the break between lessons. For example, as shown in FIG. 4, each of a plurality of image frames may further include a second video display area 103 for an object. For example, the second video display area 103 for an object is used to display a video showing a teacher who is teaching in an online class.

For example, in step S30, that in response to the quantity of image frames showing a dance move in the plurality of image frames being greater than the first pre-specified threshold, the candidate dance segment is determined to be a dance segment includes: in response to a quantity of image frames including an information display area 101 of a dance image in the plurality of image frames being greater than the first pre-specified threshold, determining the candidate dance segment to be the dance segment.

For example, by determining the candidate dance segment to be a dance segment based on whether an information display area 101 of at least some of the plurality of image frames of the candidate dance segment displays a dance image, a detection speed can be increased, and precision of the detection can be improved (compared with when whether the video display area 102 for an object shows a dance move is detected). This is because an information display area of an image frame of a video is, most of the time, used to play a PPT and the like for a class, and the PPT for the class usually shows text rather than a human body. Therefore, in a case in which an information display area 101 of an image frame of a video is used to play a PPT for a class, it may be determined that the information display area 101 does not include a human body. In this case, an image included in a video segment corresponding to the representation of the PPT for a class may be directly determined to not show a dance image, without the need to determine whether a human body does a dance move (compared with when the video display area 102 for an object is detected).

For example, that in response to the quantity of image frames including the information display area 101 of a dance image in the plurality of image frames being greater than the first pre-specified threshold, the candidate dance segment is determined to be the dance segment includes: determining whether the information display area 101 of each of the at least some of the plurality of image frames of the candidate dance segment includes a human who is standing, and in a case in which the information display area 101 includes a human who is standing, determining that the image including the information display area 101 is an image including the information display area 101 that displays a dance image. For example, by determining whether the information display area 101 of each of the at least some of the plurality of image frames of the candidate dance segment includes a human who is standing to determine the candidate dance segment to be a dance image, a detection speed can be further increased.

A method for determining whether an audio segment includes a music segment with a time length greater than or equal to a pre-specified time length is described as an example below.

For example, in step S20, the video sub-segment (namely, the candidate dance segment) that is included in the video segment and that corresponds to the music segment includes a music segment and a plurality of images that are aligned with the music segment in terms of time (that is, a plurality of images captured at the same time when the music segment is recorded).

For example, in addition to step S10 to step S30, the dance segment recognition method further includes the following step S51 and step S52.

Step S51: Divide the audio segment into a plurality of audio sub-segments.

Step S52: In response to a first quantity of sequential audio sub-segments in the plurality of audio sub-segments all being determined to be music sub-segments, determine a combination of the first quantity of the sequential audio sub-segments to be at least a part of the music segment. The first quantity is an integer not less than 3.

For example, step S51 and step S52 may be performed after step S10 is performed but before step S20 is performed. For example, step S51 and step S52 may be performed sequentially.

For example, by dividing the audio segment into a plurality of audio sub-segments and determining a combination of the first quantity of sequential audio sub-segments to be at least a part of the music segment, the sliding window rule may be applied to improve accuracy of recognizing a music segment in an audio segment.

For example, in step S51, the plurality of audio sub-segments included in the audio segment may have a time length that is a second time length t2. For example, a value of the second time length t2 may be set based on actual application requirements, and this is not limited in the at least one embodiment of the present disclosure. For example, the first time length t1 may be an integer multiple of the second time length t2. For example, the second time length t2 may be equal to five seconds or another suitable numerical value.

For example, a product of the first quantity and the second time length t2 is greater than or equal to the pre-specified time length. In this case, the combination of the first quantity of sequential audio sub-segments determined in step S52 may be used as at least a part of the music segment with a time length greater than or equal to the pre-specified time length in step S20.

For example, a combination of sequential all audio sub-segments (of a quantity greater than or equal to the first quantity) in the plurality of audio sub-segments included in the audio segment may be used as the music segment with a time length greater than or equal to the pre-specified time length in step S20. Correspondingly, a time length of the music segment is greater than or equal to the product of the first quantity and the second time length t2. In this case, whether each of the plurality of audio sub-segments obtained through step S51 is a music sub-segment may be determined (for example, through the following step S61 to step S64 or by using another suitable method). For another example, the combination of the first quantity of sequential audio sub-segments in the plurality of audio sub-segments included in the audio segment may be used as the music segment with a time length greater than or equal to the pre-specified time length in step S20. Correspondingly, a time length of the music segment is equal to the product of the first quantity and the second time length t2. In this case, for some audio segments, determining may be performed only on some audio sub-segments included in the audio segments (for example, through the following step S61 to step S64 or by using another suitable method), such that a speed of recognizing a music segment in an audio segment can be increased.

For example, in step S52, a value of the first quantity may be set based on practical experience. For example, the first quantity may be any positive integer between 3 and 15 (for example, 3 to 12); and correspondingly, the pre-specified time length may be, for example, between 15 seconds and 75 seconds (for example, 15 seconds to 60 seconds). In some other examples, a non-music sub-segment (namely, an audio sub-segment including no music sub-segment) may be wrongly determined to be a music sub-segment, and a probability of a non-music sub-segment being wrongly determined to be a music sub-segment is Mw (for example, a probability of a non-music sub-segment being wrongly determined by a third music recognition model to be a music sub-segment is Mw), and in this case, a value of the first quantity $num\_1$ may be obtained through calculation according to the following expression: $(Mw)^{num\_1} \leq Wmax$, where Wmax is an allowed (by a user) upper limit of a music sub-segment recognition error. For example, by determining a value of the first quantity $num\_1$ based on the foregoing expression, after a method for determining whether an audio sub-segment is a music sub-segment is updated (correspondingly, a probability of a non-music sub-segment being wrongly determined to be a music sub-segment may change) and/or a tolerance of a user for a music sub-segment recognition error is changed, the first quantity $num\_1$ that matches an updated determining method and/or a changed error tolerance may be set automatically, such that applicability, robustness, etc., of the dance segment recognition method provided in at least one embodiment of the present disclosure can be improved.

The inventor of the present disclosure notices during the research that an audio segment included in an online class video includes noise and an electronic sound (electronic noise). Therefore, an effect of recognizing a music segment in an audio segment identification in an online class video is poor (for example, there is low accuracy and/or a high undetected error rate) when using a music recognition model used for an offline scenario.

For example, in addition to step S10 to step S30, step S51, and step S52, the dance segment recognition method further includes the following step S61 to step S64.

Step S61: Extract a first feature vector of each of at least some audio sub-segments in a plurality of audio sub-segments by using a first music recognition model.

Step S62: Cut each of the at least some audio sub-segments in the plurality of audio sub-segments into a second quantity of subdivided audio sub-segments, and extract a second feature vector of each of the second quantity of subdivided audio sub-segments by using the second music recognition model.

Step S63: Concatenate the first feature vector and the second quantity of second feature vectors that correspond to a same audio sub-segment to obtain a concatenated feature vector corresponding to the same audio sub-segment.

Step S64: Provide the concatenated feature vector corresponding to the same audio sub-segment to a third music recognition model to determine whether the same audio sub-segment is a music sub-segment by using the third music recognition model.

For example, step S61 to step S64 may be performed after step S51 is performed but before step S52 is performed. For example, step S61 to step S64 may be performed in this sequence: step S61, step S62, step S63, and step S64. For another example, step S61 to step S64 may be performed in this sequence: step S61+step S62 (that is, step S61 and step S62 are performed at the same time), step S63, and step S64. For another example, step S61 to step S64 may be performed in this sequence: step S62, step S61, step S63, and step S64.

For example, in at least one embodiment of the present disclosure, the first feature vector of the audio sub-segment is extracted by using the first music recognition model, the second feature vector of each of the second quantity of subdivided audio sub-segments included in the audio sub-segment by using the second music recognition model, the concatenated feature vector corresponding to the audio sub-segment is obtained by concatenating the first feature vector and the second quantity of second feature vectors, and the concatenated feature vector is provided to the third music recognition model to determine whether the same audio sub-segment is a music sub-segment by using the third music recognition model. In this case, whether the audio sub-segment is a music sub-segment may be determined based on both a global feature (for example, a low-frequency feature) and a local feature (for example, a high-frequency feature) of the audio sub-segment, such that accuracy of the determining can be improved, and an application scope of the method for determining whether an audio sub-segment is a music sub-segment provided in at least one embodiment of the present disclosure can be larger. For example, the method for determining whether an audio sub-segment is a music sub-segment provided in at least one embodiment of the present disclosure may be used to determine whether a specific audio sub-segment (for example, including two seconds of music, one second of noise, and two seconds of a combined segment of a music sequence) is a music sub-segment.

For example, in at least one embodiment of the present disclosure, a first neural network, a second neural network, and a third neural network are three independent neural networks each having an input and an output.

For example, in at least one embodiment of the present disclosure, the first neural network and the second neural network related to the foregoing step S61 to step S63 are used to extract the first feature vector and the second quantity of second feature vectors according to the same audio sub-segment, to obtain the concatenated feature vector corresponding to the same audio sub-segment and enable the third neural network independent from the first neural network and the second neural network to determine whether the same audio sub-segment is a music sub-segment based on the concatenated feature vector. Compared with using a single model (for example, a single convolutional model or a single convolutional neural network) having a plurality of types of kernel sizes (a plurality of types of receptive fields) to extract a feature vector, using the method for determining whether an audio sub-segment is a music sub-segment provided in at least one embodiment of the present disclosure can provide more resistance for a segment combining music and noise and higher robustness, and the method for determining whether an audio sub-segment is a music sub-segment provided in at least one embodiment of the present disclosure can provide higher accuracy.

In an example, step S61 to step S64 may be performed on each of a plurality of audio sub-segments included in a plurality of audio segments, to determine whether each of the plurality of audio sub-segments included in the plurality of audio segments is a music sub-segment. For example, in the foregoing example, for step S52, in a case in which the first quantity of sequential audio sub-segments in the plurality of audio sub-segments are all determined to be music sub-segments, the combination of the first quantity of sequential audio sub-segments is determined to be a music segment. For another example, in the foregoing example, for step S52, a combination of all sequential music sub-segments may be determined to be a music segment (herein, a quantity of all the sequential music sub-segments is greater than the first quantity). In this case, a music segment with a greater time length (for example, a complete music segment) can be detected in an audio segment, such that the possibility of missing out some dance sub-segments of a video segment can be reduced.

In another example, for some audio segments, step S61 to step S64 may be performed on some of a plurality of audio sub-segments included in a plurality of audio segments. For example, in a case in which the first quantity of sequential audio sub-segments in some of the plurality of audio sub-segments included in the audio segment are determined to be music sub-segments, a combination of the first quantity of sequential audio sub-segments may be determined to be a music segment, and determining of whether a remaining undetected audio sub-segment included in the plurality of audio sub-segments included in the audio segment is a music sub-segment is stopped. In this case, efficiency of recognizing a music segment in an audio segment can be improved.

For example, in step S61, the first music recognition model is the first neural network and is configured to output the first feature vector. For example, the first neural network is used to extract the first feature vector from an audio sub-segment (for example, a global feature of the audio sub-segment). For example, the first neural network includes at least two fully connected layers, and the next-to-last fully connected layer included in the first neural network (a fully connected layer above the last fully connected layer included in the first neural network) is configured to output the first feature vector.

For example, in step S62, the second music recognition model is the second neural network and is configured to output the second feature vector. For example, the second neural network is used to extract the second quantity of second feature vectors (for example, a local feature of the audio sub-segment) from the second quantity of subdivided audio sub-segments included in the audio sub-segment. For example, the second neural network includes at least two fully connected layers, and the next-to-last fully connected layer included in the second neural network (a fully connected layer above the last fully connected layer included in the second neural network) is configured to output the second feature vector.

For example, a product of a dimension d of the second feature vector and the second quantity num_2 (that is, num_2×d) is equal to a dimension of the first feature vector. For example, the dimension d of the second feature vector may be 60 or another suitable numerical value, and num_2 is 5 or another suitable numerical value.

For example, in step S63, concatenation (concatenate) may be performed on the first feature vector and the second quantity of second feature vectors that correspond to the same audio sub-segment to obtain a concatenated feature vector corresponding to the same audio sub-segment. For example, a dimension of the concatenated feature vector is equal to two times the dimension of the first feature vector (that is, 2×num_2×d). For example, the dimension of the concatenated feature vector is equal to 10×d.

For example, in step S64, the third music recognition model is configured to receive the concatenated feature vector, and determine whether the same audio sub-segment is a music sub-segment based on the concatenated feature vector.

For example, the first neural network and the second neural network may be one-dimensional convolutional neural networks (CNNs) or other suitable neural networks, and the third neural network may be a multi-layer neural network (also referred to as a deep neural network) or another suitable neural network.

For example, the multi-layer neural network includes a plurality of fully connected layers but does not have a convolution layer. For example, the multi-layer neural network is configured to receive the concatenated feature vector. For example, the last fully connected layer of the multi-layer neural network is configured to output one one-dimensional matrix [a3,b3], and the elements a3 and b3 in the one-dimensional matrix are used to represent a probability of the same audio sub-segment being a music sub-segment and a probability of the same audio sub-segment being a non-music segment respectively. For example, the softmax operation may be performed on the output (for example, the one-dimensional matrix) of the last fully connected layer of the multi-layer neural network by using the softmax function, to obtain a one-dimensional matrix [a4,b4], where a4 is a probability of the audio sub-segment being a music sub-segment, b4 is a probability of the same audio sub-segment being a non-music segment, and a4 and b4 satisfy the following expression: a4+b4=1, where $0 \leq a4 \leq 1$; and $0 \leq b4 \leq 1$.

For example, a method for training a neural network for determining a music segment provided in at least one embodiment of the present disclosure may be used to train the first neural network, the second neural network, and the third neural network.

For example, the dance segment recognition method provided in at least one embodiment of the present disclosure further includes: training the first neural network, the second neural network, and the third neural network by using the method for training a neural network for determining a music segment provided in at least one embodiment of the present disclosure. For example, a specific method for training the first neural network, the second neural network, and the third neural network may refer to the method for training a neural network for determining a music segment provided in at least one embodiment of the present disclosure. Details are not provided herein again.

Figure 5:
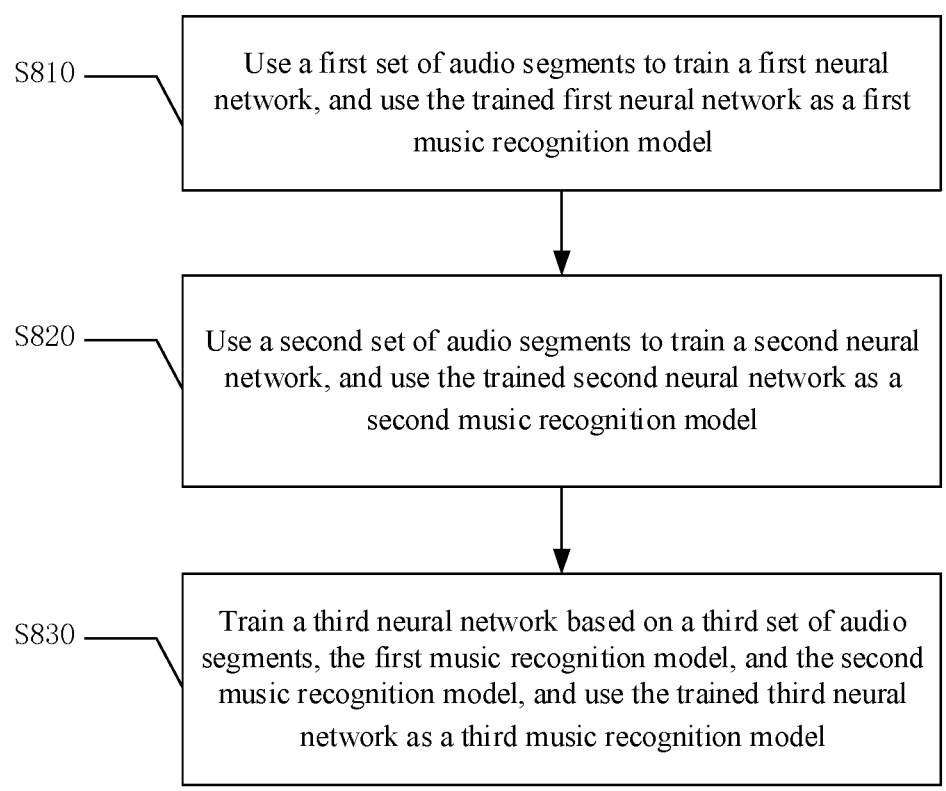
FIG. 5 is a schematic flowchart of a method for training a neural network for determining a music segment according to at least one embodiment of the present disclosure.

At least one embodiment of the present disclosure further provides a method for training a neural network for determining a music segment. FIG. 5 is a schematic flowchart of a method for training a neural network for determining a music segment according to at least one embodiment of the present disclosure. As shown in FIG. 5, the method for training a neural network for determining a music segment includes the following step S810 to step S830.

Step S810: Use a first set of audio segments to train the first neural network, and use the trained first neural network as the first music recognition model.

Step S820: Use a second set of audio segments to train the second neural network, and use the trained second neural network as the second music recognition model.

Step S830: Train a third neural network based on a third set of audio segments, the first music recognition model, and the second music recognition model, and use the trained third neural network as the third music recognition model.

For example, a time length of each audio segment in the first set of audio segments and the third set of audio segments is a first time length, a time length of each audio segment in the second set of audio segments is a second time length, and the second time length is less than the first time length. For example, a product of the second time length and the second quantity is equal to the first time length.

For example, step S810 to step S830 may be performed before the dance segment recognition method is performed, so that the first music recognition model, the second music recognition model, and the third music recognition model trained by using the method for training a neural network for determining a music segment provided in at least one embodiment of the present disclosure may be used, during the performing of the dance segment recognition method, to determine whether an audio sub-segment is a music sub-segment.

For example, step S810, step S820, and step S830 may be performed sequentially. For another example, step S820, step S810, and step S830 may be performed sequentially. For yet another example, step S810+step S820 (that is, step S810 and step S820 are performed at the same time), and step S830 may be performed sequentially.

For example, by obtaining the first neural network, the second neural network, and the third neural network through step S810 to step S830, in a process of determining whether an audio sub-segment is a music sub-segment, a global feature and a local feature of the audio sub-segment can be obtained by using the first music recognition model and the second music recognition model respectively. A concatenated feature vector obtained by using the global feature and the local feature of the audio sub-segment is provided to the third music recognition model, and the third music recognition model is used to determine whether the audio sub-segment is a music sub-segment, so that a global feature and a local feature of an audio sub-segment are better utilized in a process of determining whether the audio sub-segment is a music sub-segment, and accuracy of determining whether an audio sub-segment is a music sub-segment can be improved.

For example, in step S810, the time length of each audio segment in the first set of audio segments may be equal to a time length of the audio segment in step S10, that is, the time length of each audio segment in the first set of audio segments may be equal to the first time length t1 (for example, 60 seconds), so that the first music recognition model (namely, the trained first neural network) obtained through step S810 are more applicable for extracting the first feature vector of each of at least some audio sub-segments in the plurality of audio sub-segments in step S61.

For example, in step S810, that the first neural network is trained by using the first set of audio segments includes: extracting an audio feature of each audio segment in the first set of audio segments; and using the audio feature of each audio segment in the first set of audio segments to train the first neural network.

For example, the audio feature of the audio segment refers to a frequency domain feature (frequency domain parameter) of the audio segment. For example, the audio feature extracted from the audio segment can better demonstrate a content difference and a timbre difference of audio. For example, a frequency spectrum feature of the audio segment may be at least one of Mel-scale Frequency Cepstral Coefficients (Mel-scale Frequency Cepstral Coefficients, MFCC) and Gammatone Frequency Cepstral Coefficients (Gammatone Frequency Cepstral Coefficients, GFCC).

For example, an MFCC audio feature and a GFCC audio feature of each audio segment in the first set of audio segments may be extracted, the MFCC audio feature and the GFCC audio feature of each audio segment in the first set of audio segments are concatenated to obtain a concatenated audio feature (for example, a 38-dimensional audio feature), and the concatenated audio feature (for example, a 38-dimensional audio feature) is used as the audio feature of each audio segment in the first set of audio segments. For example, by using the concatenated audio feature obtained by concatenating the MFCC audio feature and the GFCC audio feature of each audio segment in the first set of audio segments as the audio feature of each audio segment in the first set of audio segments, the quality of the trained first neural network can be improved. For example, the quality of the first feature vector of the audio segment extracted by using the trained first neural network can be improved.

For example, in step S810, the last fully connected layer included in the first neural network is configured to output one one-dimensional matrix [c1,d1], and the elements c1 and d1 in the one-dimensional matrix are used to represent a probability of each audio segment in the first set of audio segments being a music sub-segment and a probability of each audio segment in the first set of audio segments being a non-music segment respectively. For example, the softmax operation may be performed on the output (for example, the one-dimensional matrix) of the last fully connected layer included in the first neural network by using the softmax function (correspondingly, the first neural network includes a softmax layer), to obtain a one-dimensional matrix [c2,d2], where c2 is a probability of each audio segment in the first set of audio segments being a music sub-segment, d2 is a probability of each audio segment in the first set of audio segments being a non-music segment, and c2 and d2 satisfy the following expression: $c2+d2=1$, where $0 \leq c2 \leq 1$; and $0 \leq d2 \leq 1$. For example, a parameter of the first neural network may be adjusted to minimize a loss function of the first neural network (for the audio segment in the first set of audio segments), to obtain an optimized parameter of the first neural network and the trained first neural network. For example, for a plurality of audio segments in the first set of audio segments, an actual value and an average of differences of squares of estimated values of the first neural network may be used as the loss function of the first neural network.

For example, the first neural network may be a one-dimensional convolutional neural network (CNN). In this case, the first music recognition model may be a one-dimensional CNN convolutional model. For example, by specifying the first neural network to be a one-dimensional convolutional neural network, not only the diversity of an audio signal can be overcome by the invariability of convolution, but a concurrent operation (for example, a concurrent operation at scale) can be implemented, such that a speed of performing step S61 can be increased, that is, a speed of extracting the first feature vector from each of at least some audio sub-segments in the plurality of audio sub-segments can be increased.

For example, in a process of building the first music recognition model (the first neural network), at least one of the strategies of label smoothing, learning rate decay, and dropout (a strategy of dropout) may be applied.

For example, in step S820, the time length of each audio segment in the second set of audio segments may be equal to a time length of the audio sub-segment in step S51, that is, the time length of each audio segment in the second set of audio segments may be equal to the second time length t2 (for example, five seconds), so that the second music recognition model (namely, the trained second neural network) obtained through step S820 are more applicable for extracting the second feature vector of each of the second quantity of the subdivided audio sub-segments in step S62.

For example, the second set of audio segments may be obtained by cutting each audio segment in the first set of audio segments. For example, each audio segment in the first set of audio segments may be cut into the second quantity of audio sub-segments, and at least some of a plurality of audio sub-segments obtained by cutting each audio segment in the first set of audio segments may be used as the second set of audio segments.

For example, in step S820, that the second neural network is trained by using the second set of audio segments includes: extracting an audio feature of each audio segment in the second set of audio segments. For example, an MFCC audio feature and a GFCC audio feature of each audio segment in the second set of audio segments may be extracted, the MFCC audio feature and the GFCC audio feature of each audio segment in the second set of audio segments are concatenated to obtain a concatenated audio feature (for example, a 38-dimensional audio feature), and the concatenated audio feature (for example, a 38-dimensional audio feature) is used as the audio feature of each audio segment in the second set of audio segments. For example, by using the concatenated audio feature obtained by concatenating the MFCC audio feature and the GFCC audio feature of each audio segment in the second set of audio segments as the audio feature of each audio segment in the second set of audio segments, the quality of the trained second neural network can be improved. For example, the quality of the feature vector of the audio segment extracted by using the trained second neural network can be improved.

For example, the second neural network may be a one-dimensional convolutional neural network (CNN). In this case, the second music recognition model may be a one-dimensional CNN convolutional model. For example, by specifying the second neural network to be a one-dimensional convolutional neural network, not only the diversity of an audio signal can be overcome by the invariability of convolution, but a concurrent operation (for example, a concurrent operation at scale) can be implemented, such that a speed of performing step S62 can be increased, that is, a speed of extracting the second feature vector from each of the second quantity of subdivided audio sub-segments can be increased. For example, in a process of building the second music recognition model (the second neural network), at least one of the strategies of label smoothing, learning rate decay, and dropout (a strategy of dropout) may be applied.

For example, the last fully connected layer included in the second neural network is configured to output one one-dimensional matrix [c3,d3], and the elements c3 and d3 in the one-dimensional matrix are used to represent a probability of each audio segment in the second set of audio segments being a music sub-segment and a probability of each audio segment in the second set of audio segments being a non-music sub-segment respectively. For example, the softmax operation may be performed on the output (for example, the one-dimensional matrix) of the last fully connected layer included in the second neural network by using the softmax function, to obtain a one-dimensional matrix [c4,d4], where c4 is a probability of each audio segment in the second set of audio segments being a music sub-segment, d4 is a probability of each audio segment in the second set of audio segments being a non-music sub-segment, and c4 and d4 satisfy the following expression: c4+d4=1, where 0≤c4≤1; and 0≤d4≤1. For example, a parameter of the second neural network may be adjusted to minimize a loss function of the second neural network (for the audio segment in the second set of audio segments), to obtain an optimized parameter of the second neural network and the trained second neural network.

For example, in step S830, that the third neural network is trained based on the third set of audio segments, the first music recognition model, and the second music recognition model, and the trained third neural network is used as the third music recognition model includes the following step S831 to step S835.

Step S831: Extract a first training feature vector of each audio segment in the third set of audio segments based on the first music recognition model.

Step S832: Divide each audio segment in the third set of audio segments into a pre-specified quantity of audio sub-segments.

Step S833: Extract a second training feature vector of each of the pre-specified quantity of audio sub-segments based on the second music recognition model.

Step S834: Concatenate the first training feature vector and the second training feature vector to obtain a concatenated training feature vector.

Step S835: Provide the concatenated training feature vector to the third neural network, and adjust a parameter of the third neural network based on an output value of the third neural network to minimize a loss function.

For example, step S831 to step S835 may be performed in this sequence: step S831, step S832, step S833, step S834, and step S835. For another example, step S831 to step S835 may be performed in this sequence: step S832, step S833, step S831, step S834, and step S835. For yet another example, step S831 may be performed when at least one of step S832 and step S833 is performed.

For example, in step S830, the time length of each audio segment in the third set of audio segments may be equal to a time length of the audio segment in step S10, that is, the time length of each audio segment in the third set of audio segments may be equal to the first time length t1 (for example, 60 seconds), so that the third music recognition model (namely, the trained third neural network) obtained through step S830 are more applicable for determining whether an audio sub-segment is a music sub-segment in step S63. For example, the third neural network may be a deep neural network; or for example, the third music recognition model may be a multi-layer perceptron model.

For example, in step S830 (namely, the process of training the third neural network), parameters of the first music recognition model and the second music recognition model remain unchanged, that is, in step S830, the first music recognition model and the second music recognition model are both used as a feature extractor. For example, the third set of audio segments may be the same as or different from the first set of audio segments.

For example, in step S831, the trained first neural network (namely, the first music recognition model) may extract the first training feature vector from an audio feature of each audio segment in the third set of audio segments. For example, the trained first neural network includes at least two fully connected layers, and the next-to-last fully connected layer included in the trained first neural network (a fully connected layer above the last fully connected layer included in the trained first neural network) is configured to output the first training feature vector. For example, a dimension of the first training feature vector is num_2×d (for example, 5×d). Herein, d is a dimension of the second training feature vector, and num_2 is the second quantity.

For example, in step S832, the pre-specified quantity may be the second quantity num_2; and each of the pre-specified quantity of audio sub-segments may have a time length that is the second time length t2 (for example, five seconds).

For example, in step S833, the trained second neural network (namely, the second music recognition model) may extract the second training feature vector from an audio feature of each audio segment in the third set of audio segments. For example, the trained second neural network includes at least two fully connected layers, and the next-to-last fully connected layer included in the trained second neural network (a fully connected layer above the last fully connected layer included in the trained second neural network) is configured to output the second training feature vector. For example, a dimension of each second training feature vector may be d.

For example, in step S834, concatenation may be performed on the first training feature vector and the second quantity of second training feature vectors that correspond to the same audio sub-segment in the third set of audio segments to obtain a concatenated training feature vector, and a dimension of the concatenated training feature vector may be 2×num_2×d (for example, 10d). For example, in step S834, the first training feature vector and the second training feature vector for the concatenation correspond to the same audio segment in the third set of audio segments.

For example, in step S835, that the concatenated training feature vector is provided to the third neural network, and the parameter of the third neural network is adjusted based on the output value of the third neural network to minimize the loss function includes the following step S835a and step S835b.

Step S835a: Provide the concatenated training feature vector to the third neural network.

Step S835b: Adjust the parameter of the third neural network based on the output value of the third neural network to minimize the loss function.

For example, a specific method of setting the loss function may refer to a related technology. For example, for a plurality of samples, an actual (target) value and an average of differences of squares of estimated values may be used as the loss function, and in step S835*b*, the loss function may be minimized by adjusting the parameter of the third neural network.

For example, in step S835, the third neural network may be a multi-layer neural network, and the multi-layer neural network includes a plurality of fully connected layers but does not have a convolution layer. For example, the multi-layer neural network (the first fully connected layer of the multi-layer neural network) is configured to receive the concatenated training feature vector; and the softmax operation may be performed on an output of the last fully connected layer of the multi-layer neural network by using the softmax function, and the parameter of the third neural network may be adjusted based on data (as an estimated value) obtained after the softmax operation is performed and an actual (target) value to minimize the loss function of the third neural network, such that an optimized parameter of the third neural network and the trained third neural network can be obtained.

For example, in addition to step S810 to step S830, the training method provided in at least one embodiment of the present disclosure further includes step S840.

Step S840: Obtain an audio positive sample and an audio negative sample. For example, in the training method provided in at least one embodiment of the present disclosure further includes: creating the first set of audio segments, the second set of audio segments, and the third set of audio segments based on at least a part of the audio positive sample (at least some audio positive samples) and at least a part of the audio negative sample (at least some audio negative samples) that are obtained in step S840.

For example, step S840 includes the following step S841 and step S842.

Step S841: Find out a candidate positive sample and a candidate negative sample in a plurality of sample audio segments by using a fourth music recognition model.

Step S842: Use at least a part of the candidate positive sample as at least the part of the audio positive sample, and use at least a part of the candidate negative sample as at least the part of the audio negative sample.

For example, in step S841, a time length of each of the sample audio segments may be equal to a time length of the audio segment in step S10, that is, the time length of each of the sample audio segments may be equal to the first time length t1 (for example, 60 seconds), so that the candidate positive sample and the candidate negative sample found through step S841 are more applicable for training the first neural network, the second neural network, and the third neural network.

For example, a fourth music recognition model may be a music recognition model used for an offline scenario. For example, an audio feature of a sample audio segment may be used as an input to the fourth music recognition model. For example, an MFCC audio feature (for example, 42-dimensional third-order MFCC audio feature) of a sample audio segment may be used as an input to the fourth music recognition model.

For example, the fourth music recognition model may recognize and output music segments included in a plurality of sample audio segments. For example, an audio sub-segment that is recognized by the fourth music recognition model as a music segment may be marked as a candidate positive sample.

For example, the fourth music recognition model may recognize and output non-music segments included in a plurality of sample audio segments. For example, an audio sub-segment that is recognized by the fourth music recognition model as a non-music segment may be marked as a candidate negative sample. For another example, an audio sub-segment in a plurality of sample audio segments that has not been marked as a candidate positive sample may be marked as a candidate negative sample.

For example, at least one type (for example, both) of the foregoing candidate positive sample and the candidate negative sample may be rechecked by man. For example, through rechecking by man, a wrongly recognized candidate positive sample can be marked as a candidate negative sample, and a wrongly recognized candidate negative sample can be marked as a candidate positive sample. Further, in step S842, at least a part (for example, all) of an updated candidate positive sample is used as at least a part of the audio positive sample, and at least a part (for example, all) of an updated candidate negative sample as at least a part of the audio negative sample. For example, through rechecking by man, a wrongly recognized candidate positive sample can be removed and marked as a candidate negative sample, and a wrongly recognized candidate negative sample can be marked as a candidate positive sample. Further, in step S842, at least a part (for example, all) of a remaining candidate positive sample (namely, all candidate positive samples obtained by removing an audio negative sample that is wrongly recognized as a candidate positive sample from a candidate positive sample found by the fourth music recognition model) is used as at least a part of the audio positive sample, and at least a part (for example, all) of a remaining candidate negative sample (namely, all candidate negative samples obtained by removing an audio positive sample that is wrongly recognized as a candidate negative sample from a candidate negative sample found by the fourth music recognition model) as at least a part of the audio negative sample.

For example, in at least one embodiment of the present disclosure, that the audio positive sample and the audio negative sample are obtained includes: finding out the candidate positive sample and the candidate negative sample in a plurality of sample audio segments by using the fourth music recognition model, using at least a part of the candidate positive sample as at least the part of the audio positive sample, and using at least a part of the candidate negative sample as at least the part of the audio negative sample. In this case, efficiency of obtaining an audio positive sample and an audio negative sample can be improved, and a time for training a neural network for determining a music segment can be reduced.

For example, in at least one embodiment of the present disclosure, that the audio positive sample and the audio negative sample are obtained further includes: after the candidate positive sample and the candidate negative sample are found in a plurality of sample audio segments by using the fourth music recognition model, and before at least a part of the candidate positive sample is used as at least the part of the audio positive sample and at least a part of the candidate negative sample is used as at least the part of the audio negative sample, rechecking the candidate positive sample and the candidate negative sample found by the fourth music recognition model in the plurality of sample audio segments with a manual process. In this case, accuracy of obtaining an audio positive sample and an audio negative sample can be improved, and a undetected error rate for an audio positive sample and/or an audio negative sample can be reduced.

The inventor of the present disclosure notices during the research that the candidate positive sample and the candidate negative sample (for example, data distribution of an audio positive sample and an audio negative sample) found by the fourth music recognition model may contain a pre-specified rule. For example, the candidate positive sample found by the fourth music recognition model may tend to be a specific type of music, so that the fourth music recognition model may miss out on detecting some types of music. Therefore, if only at least a part of the candidate positive sample and the candidate negative sample found by the fourth music recognition model is used as at least a part of the audio positive sample and the audio negative sample, at least one (for example, all) of the first music recognition model, the second music recognition model, and the third music recognition model may have a model bias (that is, at least one of the trained first neural network, second neural network, and third neural network has a bias).

For example, in addition to step S841 and step S842, step S840 further includes the following step S843.

Step S843: Use a positive sample and a negative sample that are calibrated by man as at least the part of the obtained audio positive sample and at least the part of the obtained audio negative sample respectively. For example, the positive sample and the negative sample that are calibrated by man in step S843 refer to a positive sample and a negative sample that are completely calibrated by man. For example, a positive sample (namely, a music segment) and a negative sample (namely, a non-music segment) may be found directly in a sample audio segment by man.

For example, by using the positive sample and the negative sample that are calibrated by man as at least the part of the obtained audio positive sample and at least the part of the obtained audio negative sample respectively, a possibility of at least one (for example, all) of the first music recognition model, the second music recognition model, and the third music recognition model having a model bias can be reduced, that is, a possibility of at least one (for example, all) of the trained first neural network, second neural network, and third neural network having a bias can be reduced.

The inventor of the present disclosure notices during the research that a feature of some electronic sounds may be similar to a musical feature, so that the third music recognition model may wrongly recognize an audio sub-segment that includes an electronic sound but no music as a music segment, and recognition accuracy of the third music recognition model is reduced.

For example, in addition to step S841 and step S842, step S840 further includes the following step S844.

Step S844: In at least one example of the training method, that the audio positive sample and the audio negative sample is obtained includes: using an electronic noise segment as at least the part of the audio negative sample.

For example, by using the electronic noise segment as at least the part of the audio negative sample, recognition accuracy and robustness (for example, robustness for electronic noise) of the third music recognition model can be improved, and recognition accuracy and robustness of the trained third neural network can be improved.

For example, the method for training a neural network for determining a music segment includes the foregoing step S810 to step S830 and step S840. For example, step S840 includes the foregoing step S841, step S842, step S843, and step S844.

For example, when the first neural network, the second neural network, and the third neural network are trained, a total time length of a used audio positive sample may be around (for example, equal to) three hours, a total time length of a used audio negative sample may be greater than (for example, far greater than) three hours, and a total time length of a used electronic noise may be around (for example, equal to) 10 minutes.

Figure 6A:
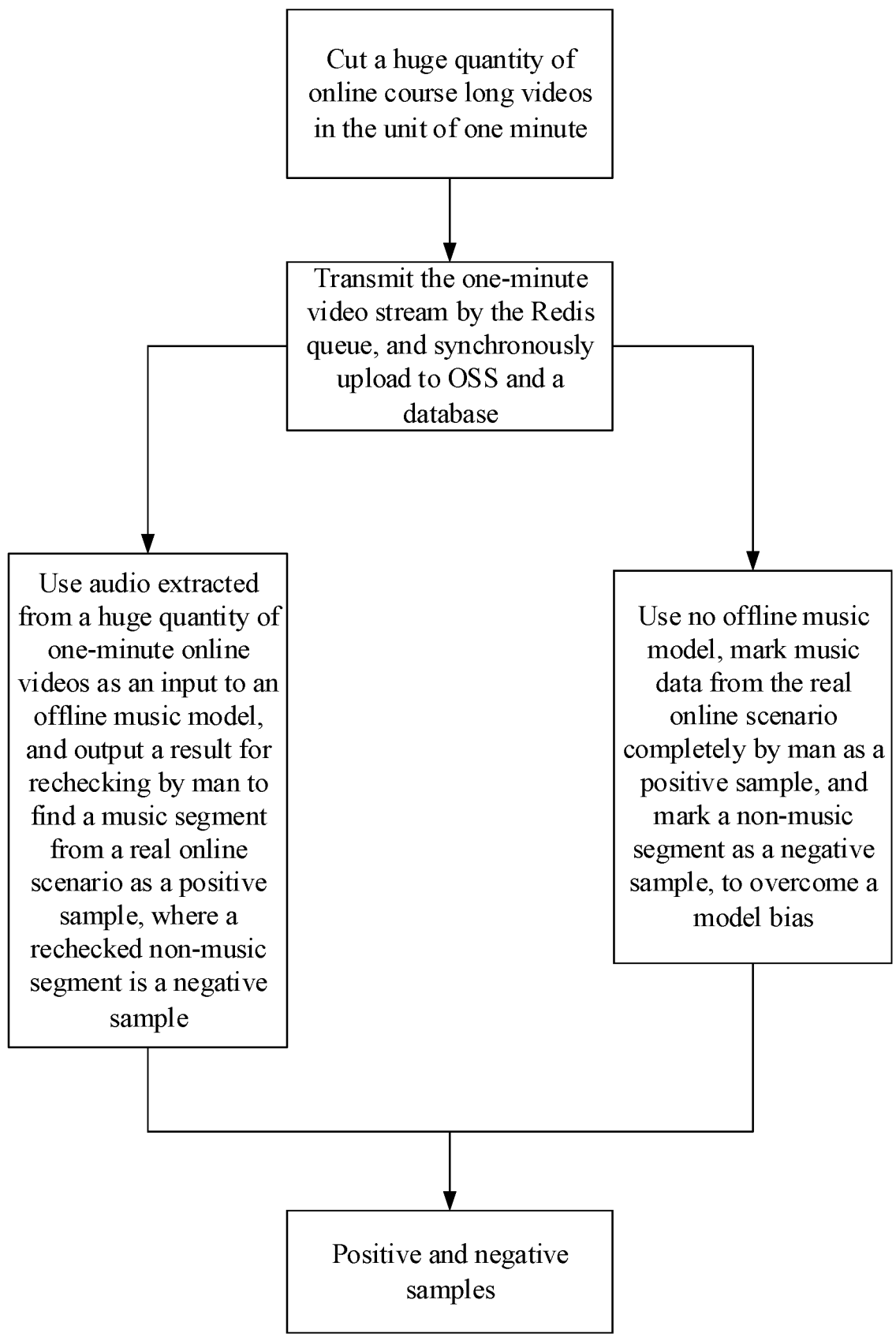
FIG. 6A is a schematic flowchart of a first part of a method for training a neural network for determining a music segment according to at least one embodiment of the present disclosure.
Figure 6B:
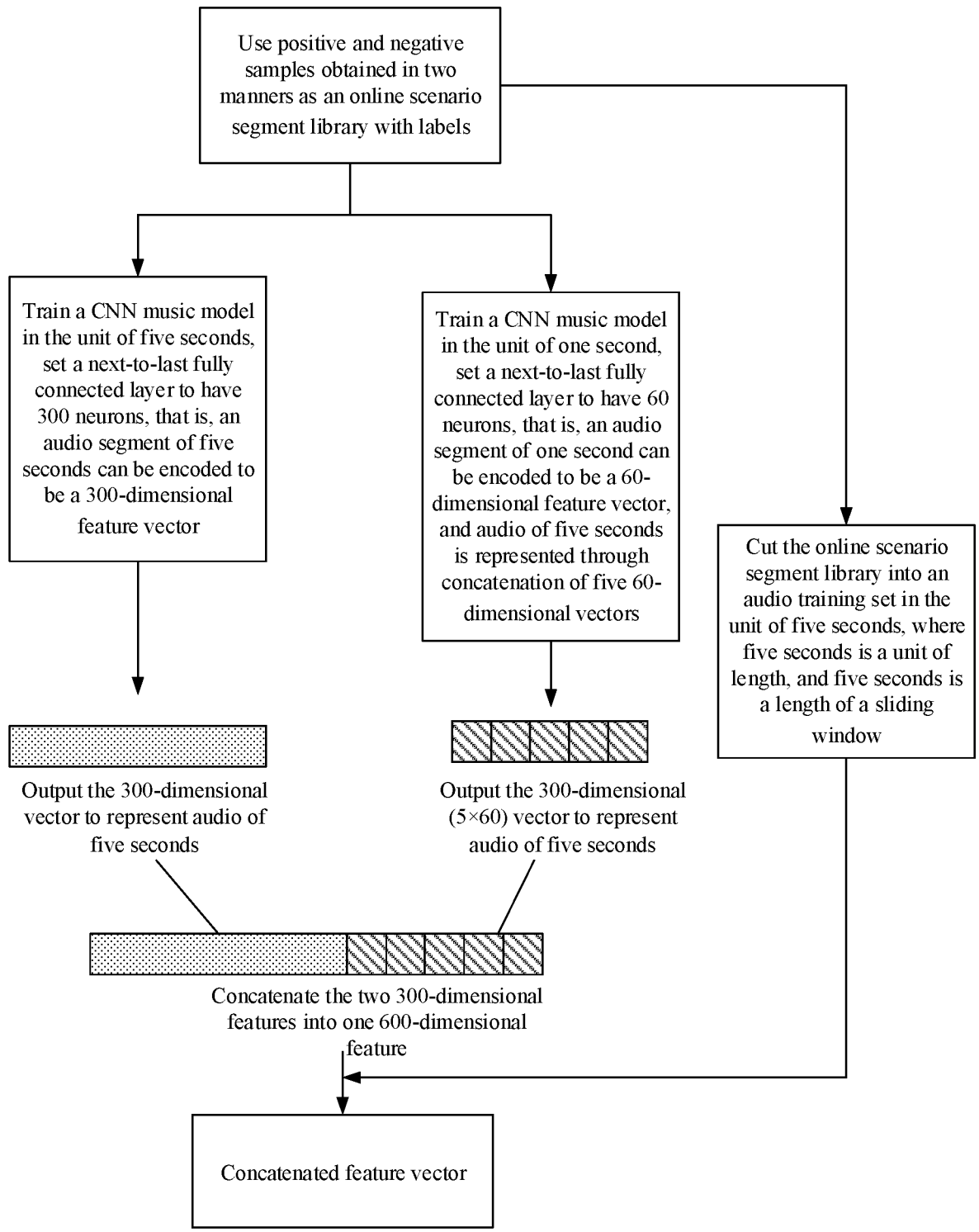
FIG. 6B is a schematic flowchart of a second part of a method for training a neural network for determining a music segment according to at least one embodiment of the present disclosure.
Figure 6C:
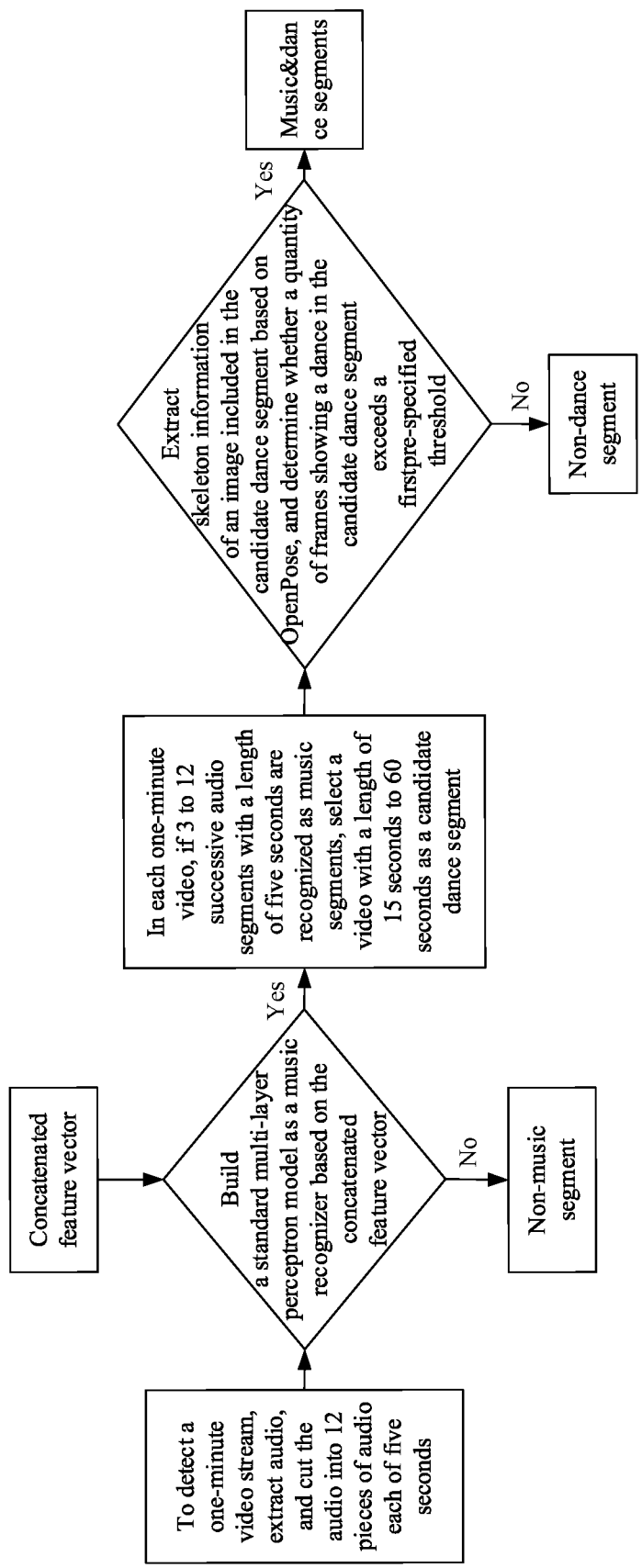
FIG. 6C is a schematic flowchart of a dance segment recognition method according to at least one embodiment of the present disclosure.

FIG. 6A is a schematic flowchart of a first part of a method for training a neural network for determining a music segment according to at least one embodiment of the present disclosure; FIG. 6B is a schematic flowchart of a second part of the method for training a neural network for determining a music segment according to at least one embodiment of the present disclosure; FIG. 6C is a schematic flowchart of a dance segment recognition method according to at least one embodiment of the present disclosure; and FIG. 6C is also a schematic diagram of a part of training the third neural network according to at least one embodiment of the present disclosure.

The dance segment recognition method and the method for training a neural network for determining a music segment provided in at least one embodiment of the present disclosure are described as an example in conjunction with FIG. 6A to FIG. 6C. It should be noted that, in FIG. 6A to FIG. 6C, the dance segment recognition method and the method for training a neural network for determining a music segment provided in at least one embodiment of the present disclosure are described as an example in which whether a video segment included in an online class video (also referred to as an online course) includes a dance segment is detected, but at least one embodiment of the present disclosure is not limited to this.

For example, as shown in FIG. 6A, the following method may be used to obtain a positive sample and a negative sample (namely, an audio positive sample and an audio negative sample) for training the first neural network and the second neural network.

First, a huge quantity of online course long videos are cut to obtain a plurality of (for example, a huge quantity of) video segments (video streams). Herein, a time length of a video segment is one minute.

Second, the plurality of video segments (video streams) are transmitted by the Redis queue (a message queue based on Redis). Herein, Redis is a type of database. For example, the plurality of video segments may further be uploaded onto a cloud memory (for example, Alibaba Cloud's Object Storage Service (OSS)) and a database.

Then, a plurality of audio segments are extracted from the plurality of (for example, a huge quantity of) video segments, and the positive sample and the negative sample are obtained from the extracted audio segments. The positive sample and the negative sample may be obtained from the plurality of extracted audio segments according to at least one of the following two methods.

In the first method, the extracted audio segments may be provided to an offline music model (for example, a music recognition model for an offline scenario), to use the extracted audio segments as input data of the offline music model. The offline music model may output an audio sub-segment that is recognized by the offline music model as a positive sample. For example, the audio sub-segment that is recognized by the offline music model as a positive sample may be rechecked by man to find, in the audio sub-segment that is recognized by the offline music model as a positive sample, a real music segment as an audio positive sample and mark an audio sub-segment that is wrongly recognized as a positive sample as an audio negative sample. In the second method, an offline music model is not used, but some music data (music segments) from a real online scenario is marked as an audio positive sample by man, and a non-music segment from a real online scenario is marked as an audio negative sample by man.

For example, by obtaining the positive sample and the negative sample from the plurality of audio segments by using the first method, efficiency of obtaining the positive sample and the negative sample can be improved; and by obtaining the positive sample and the negative sample from the plurality of as by using the second method, a possibility of a model (at least one of the first music recognition model, the second music recognition model, and the third music recognition model) having a model bias can be reduced. For example, by combining the first method and the second method, not only efficiency of obtaining the positive sample and the negative sample can be improved, and a possibility of a model (at least one of the first music recognition model, the second music recognition model, and the third music recognition model) having a model bias can be reduced.

For example, as shown in FIG. 6B, a set of positive and negative samples (for example, a set of positive and negative samples obtained by using the first method and the second method) may be used as an online scenario segment library with labels and used to train at least one (for example, all) of the first music recognition model, the second music recognition model, and the third music recognition model.

For example, as shown in FIG. 6B, in a process of training the first neural network to obtain the first music recognition model (that is, in a process of training a CNN music model as shown in FIG. 6B), a time length of an audio segment received by the first neural network may be set to 5 seconds (that is, the CNN music model is trained in the unit of five seconds as shown in FIG. 6B) For example, 300 neurons may be set in the next-to-last fully connected layer included in the first neural network. Correspondingly, a 300-dimensional feature vector may be obtained by using the first neural network based on the audio segment with a time length of five seconds (that is, the audio segment of five seconds shown in FIG. 6B may be encoded to be a 300-dimensional feature vector).

For example, as shown in FIG. 6B, in a process of training the second neural network to obtain the second music recognition model (that is, in a process of training a CNN music model as shown in FIG. 6B), a time length of an audio segment received by the second neural network may be set to 1 second (that is, the CNN music model is trained in the unit of one second as shown in FIG. 6B) For example, 60 neurons may be set in the next-to-last fully connected layer included in the second neural network. Correspondingly, a 60-dimensional feature vector may be obtained by using the second neural network based on the audio segment with a time length of one second (that is, the audio segment of one second shown in FIG. 6B may be encoded to be a 60-dimensional feature vector). For example, because the audio segment with a time length of five seconds may be divided into five audio segments of one second, five 60-dimensional feature vectors that correspond to the five audio segments of one second may be concatenated into a 300-dimensional (5×60 dimensions) feature vector, and the 300-dimensional feature vector may be used to represent the audio segment with a time length of five seconds.

For example, as shown in FIG. 6B, for the same audio segment with a time length of five seconds, the 300-dimensional feature vector obtained by using the first neural network may be used to represent the same audio segment with a time length of five seconds, and the second neural network may be used to obtain a 300-dimensional (5×60 dimensions) feature vector. Then, concatenation (concatenate) may be performed on the two 300-dimensional feature vectors to represent the same audio segment with a time length of five seconds, to obtain a 600-dimensional feature vector corresponding to the same audio segment with a time length of five seconds, where the 600-dimensional feature vector is further used to represent the same audio segment with a time length of five seconds. As shown in FIG. 6C, the 600-dimensional feature vector extracted from the audio segment with a time length of five seconds is used as a concatenated feature for building a standard multi-layer perceptron model. For example, the foregoing standard multi-layer perceptron model that has been built is used as a music recognizer in the dance segment recognition method provided in at least one embodiment of the present disclosure.

For example, as shown in FIG. 6C, dance segment recognition may be performed by using the music recognizer according to the following method.

First, as shown in FIG. 6C, audio (an audio segment) is extracted from a one-minute video stream (video segment) that is to be detected (recognized), and the audio is cut into 12 short pieces of audio (audio sub-segments) with a length of five seconds.

Then, as shown in FIG. 6C, for each of the foregoing 12 short pieces of audio (audio sub-segments) with a length of five seconds, the 600-dimensional feature vector (a concatenated feature vector) is obtained by using the first neural network and the second neural network, and the 600-dimensional feature vector (the concatenated feature vector) is input to the music recognizer to determine that each of the foregoing 12 short pieces of audio (audio sub-segments) with a length of five seconds is a music sub-segment or a non-music sub-segment.

Again, as shown in FIG. 6C, whether there are 3 to 12 successive audio sub-segments with a length of five seconds, in the 12 audio sub-segments with a length of five seconds, included in the one-minute video, that are recognized as music sub-segments is determined. In a case in which there are 3 to 12 successive audio sub-segments with a length of five seconds, in the 12 audio sub-segments with a length of five seconds, included in the one-minute video, that are recognized as music sub-segments, the video segment corresponding to the 3 to 12 successive audio sub-segments with a length of five seconds is used as a candidate dance segment.

For example, as shown in FIG. 6C, one image frame may be extracted from the candidate dance segment every second, and for each extracted image frame, skeleton information of the image frame included in the candidate dance segment is extracted by OpenPose, to determine, based on the skeleton information of a plurality of image frames included in the candidate dance segment, whether a quantity of frames showing a dance included in the candidate dance segment exceeds a first pre-specified threshold. In a case in which the quantity of frames showing a dance included in the candidate dance segment exceeds the first pre-specified threshold, the candidate dance segment is determined to be a music and dance segment; or in a case in which the quantity of frames showing a dance included in the candidate dance segment does not exceed the first pre-specified threshold, the candidate dance segment is determined to be a non-dance segment.

Figure 7:
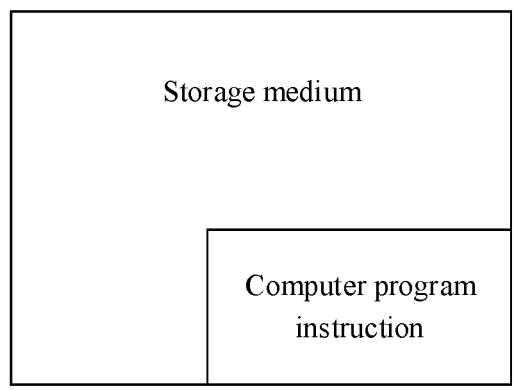
FIG. 7 is a schematic block diagram of a storage medium according to at least one embodiment of the present disclosure.

At least one embodiment of the present disclosure further provides a storage medium (for example, a non-transitory storage medium). FIG. 7 is a schematic block diagram of a storage medium according to at least one embodiment of the present disclosure. As shown in FIG. 7, the storage medium stores a computer program instruction, and when the computer program instruction is executed by a processor, a computer is enabled to perform the following method, including: extracting an audio segment from a video segment; in response to the audio segment including a music segment with a time length greater than or equal to a pre-specified time length, using a video sub-segment that is included in the video segment and that corresponds to the music segment as a candidate dance segment; and in response to a quantity of image frames containing a dance move in a plurality of image frames of the candidate dance segment being greater than a first pre-specified threshold, determining the candidate dance segment to be a dance segment. For example, the storage medium can increase a speed of recognizing a dance segment in a video segment.

For example, a computer program instruction stored in the storage medium, when executed by a processor, a computer is enabled to perform the dance segment recognition method provided in any of the foregoing embodiments. Details are not provided herein again.

For example, the storage medium may be of various types and include a tangible storage medium, a carrier medium, a physical transmission medium, or the like. A stable storage medium may include an optical disc or a magnetic disk and a storage system that is used in another computer or a similar device and that can implement the system components described in the figure. A unstable storage medium may include a dynamic memory, for example, a main memory or the like of a computer platform. The tangible transmission medium may include a coaxial cable, a copper cable, and an optical fiber, for example, a line forming a bus inside a computer system. The carrier transmission medium may transfer an electrical signal, an electromagnetic signal, a sound wave signal, a light wave signal, and the like. These signals may be generated by using a communication method based on wireless electrical frequencies or infrared data. A usual storage medium (for example, a computer-readable medium) includes a hard disk, a floppy disk, a magnetic tape, or any other magnetic medium; a CD-ROM, a DVD, a DVD-ROM, or any other optical medium; a punch card or any other physical storage medium including a small hole mode; a RAM, a PROM, an EPROM, a FLASH-EPROM, or any other memory chip or magnetic tape; a carrier or cable for transmitting data or instructions or a connection apparatus for transmitting a carrier, or any other data that can be read by using a computer program instruction (for example, program code) and/or by a computer.

The computer program instruction (for example, program code) for the operations in the present disclosure can be written in one or more programming languages or a combination of thereof. The programming languages include, but is not limited to, an object-oriented programming language, for example, Java, Smalltalk, and C++, and further include conventional procedural programming languages, for example, "C" language or similar programming languages. The program code may be completely executed on a user computer, partially executed on a user computer, executed as an independent soft package, partially executed on a user computer and partially executed on a remote computer, or completely executed on a remote computer or server. In a case in which a remote computer is used, the remote computer may be connected to a user computer via any type of network, including a local area network (LAN) or a wide area network (WAN), or may be connected to an external computer (for example, via the Internet provided by an Internet service provider).

Figure 8:
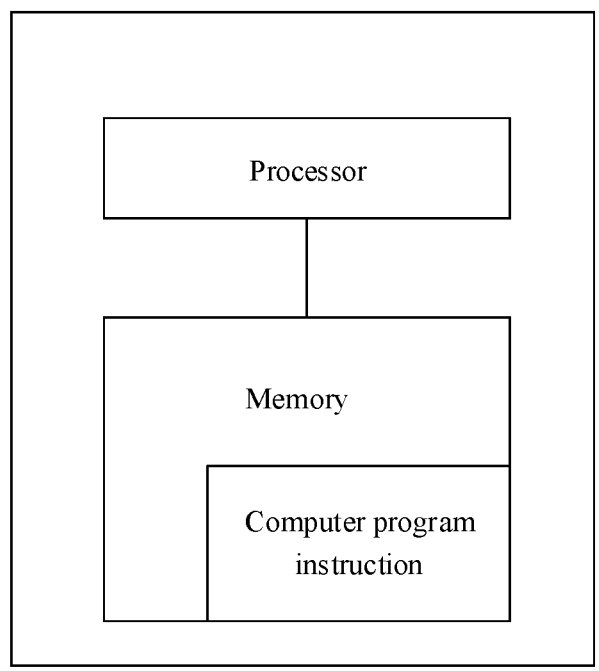
FIG. 8 is a schematic flowchart of a dance segment recognition apparatus according to at least one embodiment of the present disclosure.

At least one embodiment of the present disclosure further provides a dance segment recognition apparatus. FIG. 8 is a schematic flowchart of a dance segment recognition apparatus according to at least one embodiment of the present disclosure. As shown in FIG. 8, the dance segment recognition apparatus includes: a processor and a memory. The memory stores a computer program instruction adaptable to be executed by the processor, and when the computer program instruction is executed by the processor, the processor is enabled to perform the following method: extracting an audio segment from a video segment; in response to the audio segment including a music segment with a time length greater than or equal to a pre-specified time length, using a video sub-segment that is included in the video segment and that corresponds to the music segment as a candidate dance segment; and in response to a quantity of image frames containing a dance move in a plurality of image frames of the candidate dance segment being greater than a first pre-specified threshold, determining the candidate dance segment to be a dance segment. For example, the present dance segment recognition apparatus can increase the speed of recognizing a dance segment in a video segment.

For example, the processor is, for example, a central processing unit (CPU), a graphics processing unit (GPU), a tensor processing unit (TPU), or another type of processing unit having a data processing capability and/or instruction execution capability. For example, the processor may be implemented as a general-purpose processor, or may be a single chip computer, a microprocessor, a digital signal processor, a dedicated image processing chip, or a field programmable logic array. For example, the memory may include at least one of a volatile memory and a non-volatile memory. For example, the memory may include a read-only memory (ROM), a hard disk, and a flash memory. Correspondingly, the memory may be implemented as one or more computer program products, and the computer program product may include various forms of computer-readable storage media, and the computer-readable storage medium may store one or more computer program instructions. The processor may run the program instruction to perform any dance segment recognition method provided in at least one embodiment of the present disclosure. The memory may further store various other applications and various types of data. For example, various types of data or the like used and/or generated by the application.

Figure 9:
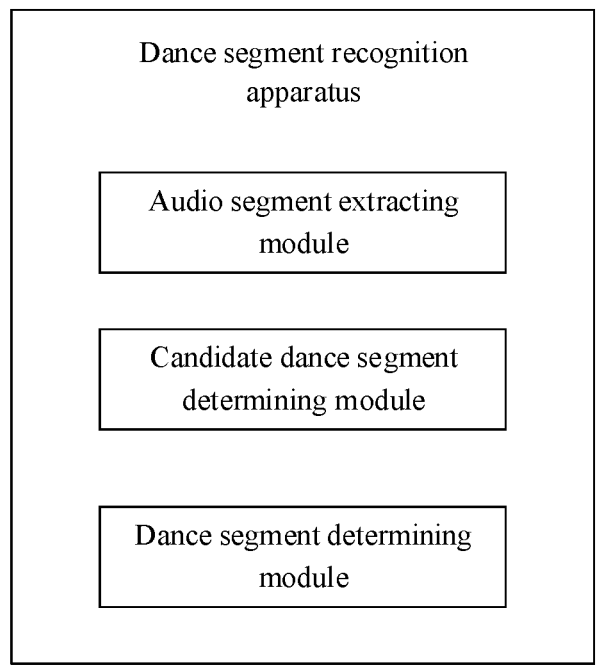
FIG. 9 is a schematic flowchart of another dance segment recognition apparatus according to at least one embodiment of the present disclosure.

At least one embodiment of the present disclosure further provides another dance segment recognition apparatus. FIG. 9 is a schematic flowchart of another dance segment recognition apparatus according to at least one embodiment of the present disclosure. As shown in FIG. 9, the another dance segment recognition apparatus includes an audio segment extracting module, a candidate dance segment determining module, and a dance segment determining module. The audio segment extracting module is configured to extract an audio segment from a video segment; the candidate dance segment determining module is configured to: in response to the audio segment including a music segment with a time length greater than or equal to a pre-specified time length, use a video sub-segment that is included in the video segment and that corresponds to the music segment as a candidate dance segment; and the dance segment determining module is configured to: in response to a quantity of image frames containing a dance move in a plurality of image frames of the candidate dance segment being greater than a first pre-specified threshold, determine the candidate dance segment to be a dance segment. For example, the present dance segment recognition apparatus can increase the speed of recognizing a dance segment in a video segment.

For example, the audio segment extracting module, the candidate dance segment determining module, the dance segment determining module, and a function described in at least one embodiment of the present disclosure may be implemented by software, firmware, hardware (for example, a hardware logical component), or any combination thereof. In some examples, the audio segment extracting module, the candidate dance segment determining module, and the dance segment determining module provided in at least one embodiment of the present disclosure may be at least partially executed by one or more hardware logical components. For example, not as a limitation, a demonstrative type of hardware logical component that may be used includes a field programmable logic array (FPGA), an application-specific integrated circuit (ASIC), an application-specific standard product (ASSP), a system-on-chip (SOC), a complex programmable logic device (CPLD), or the like.

For example, the another dance segment recognition apparatus according to at least one embodiment of the present disclosure further includes an audio sub-segment dividing module and a music segment determining module. The audio sub-segment dividing module is configured to divide the audio segment into a plurality of audio sub-segments. The music segment determining module is configured to: in response to a first quantity of sequential audio sub-segments in the plurality of audio sub-segments all being determined to be music sub-segments, determine a combination of the first quantity of the sequential audio sub-segments to be at least a part of the music segment.

For example, the first quantity is an integer not less than 3.

For example, the another dance segment recognition apparatus according to at least one embodiment of the present disclosure further includes a first music recognition model module, a second music recognition model module, a concatenating module, and a third music recognition model module. The first music recognition model module is configured to extract a first feature vector of each of at least some audio sub-segments in a plurality of audio sub-segments by using a first music recognition model. The second music recognition model module is configured to: in response to cutting each of the at least some audio sub-segments in the plurality of audio sub-segments into a second quantity of subdivided audio sub-segments, extract a second feature vector of each of the second quantity of subdivided audio sub-segments. The concatenating module is configured to concatenate the first feature vector and the second quantity of second feature vectors that correspond to a same audio sub-segment to obtain a concatenated feature vector corresponding to the same audio sub-segment. The third music recognition model module is configured to: obtain the concatenated feature vector corresponding to the same audio sub-segment, and determine whether the same audio sub-segment is a music sub-segment.

It should be noted that, for clarity and briefness, the embodiments of the present disclosure have not listed out all components of the another dance segment recognition apparatus. Those skilled in the art may provide or dispose, based on specific requirements, another component that is not shown. This is not limited in the present disclosure.

Figure 10:
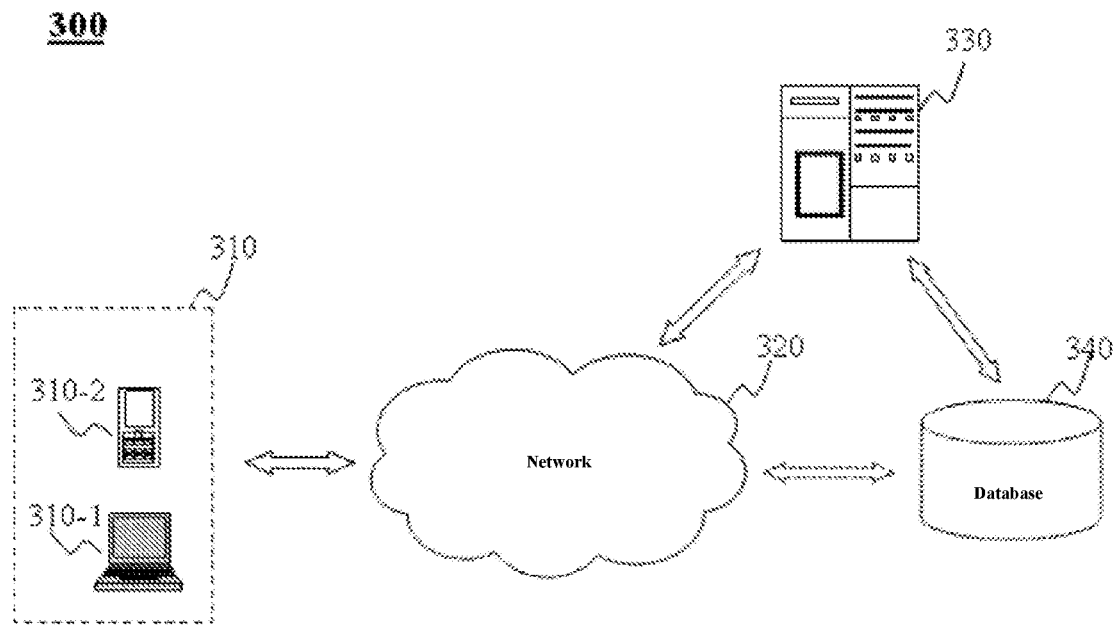
FIG. 10 is a schematic scenario diagram of a dance segment recognition apparatus according to at least one embodiment of the present disclosure.

FIG. 10 is a schematic scenario diagram of a dance segment recognition apparatus according to at least one embodiment of the present disclosure. As shown in FIG. 10, the dance segment recognition apparatus 300 may include a terminal 310, a network 320, a server 330, and a database 340. For example, the dance segment recognition apparatus shown in FIG. 10 may be implemented according to the dance segment recognition method according to at least one embodiment of the present disclosure.

For example, the terminal 310 may be a computer 310-1 or a portable terminal 310-2 shown in FIG. 10, but this is not limited in at least one embodiment of the present disclosure. It can be understood that the terminal may alternatively be any other type of electronic device that can receive, process, and display data and that may include any of a desktop computer, a laptop computer, a tablet computer, and a mobile phone, and any combination thereof.

For example, the network 320 may be a single network or a combination of at least two different networks. For example, the network 320 may include, but is not limited to, one of a local area network, a wide area network, a public network, a dedicated network, the Internet, and a mobile communication network, or a combination thereof.

For example, the server 330 may be a single server or a collection of servers, where each server in the collection of servers is connected via a wired network or a wireless network. The wired network may perform communication via, for example, a twisted-pair cable, a coaxial cable, or optical fiber transmission, and the wireless network may perform communication via, for example, a 3G/4G/5G mobile communication network, Bluetooth, Zigbee, or Wi-Fi. A type or functionality of the network is not limited in the present disclosure. The collection of servers may be centralized, for example, may be a data center, or may be distributed. The server may be local or remote. For example, the server 330 may be a general-purpose server or a dedicated server, and may be a virtual server, a cloud server, or the like.

For example, the database 340 may be used to store various data used, generated, and output during the operation of the terminal 310 and the server 330. The database 340 may be connected to or communicate with the server 330 or a part of the server 330 via the network 320, or may be connected to or communicate with the server 330 directly, or may be connected to or communicate with the server 330 by a combination of these two manners. In some embodiments, the database 340 may be an independent device. In some other embodiments, the database 340 may be integrated in at least one of the terminal 310 and the server 330. For example, the database 340 may be disposed on the terminal 310, or may be disposed on the server 330. For another example, the database 340 may be distributed, where one part is disposed on the terminal 310, and the other part is disposed on the server 330.

For example, the server 330 may receive a plurality of video segments (for example, from the database 340 or a message system), and the dance segment recognition method provided in at least one embodiment of the present disclosure is performed on each of the plurality of video segments. For example, a dance segment recognized by using the dance segment recognition method provided in at least one embodiment of the present disclosure may be stored in a database (for example, a specialized database), which, compared with storing the recognized dance segment in the terminal 310 (for example, a computer), can provide more convenience of using the recognized dance segment when needed. For example, when the recognized dance segment is needed for, for example, making a summary for a short video, the terminal 310 may read the recognized dance segment from the database 340.

For example, the server 330 may receive a first set of audio segments, a second set of audio segments, and a third set of audio segments. For another example, the server 330 may receive an online class video and obtain at least a part of a first set of audio segments, a second set of audio segments, and a third set of audio segments according to a method for training a neural network for determining a music segment.

For example, the server 330 may build a first music recognition model, a second music recognition model, and a third music recognition model by using the first set of audio segments, the second set of audio segments, and the third set of audio segments according to the method for training a neural network for determining a music segment. The first music recognition model, the second music recognition model, and the third music recognition model may be used in the dance segment recognition method provided in at least one embodiment of the present disclosure.

Figure 11:
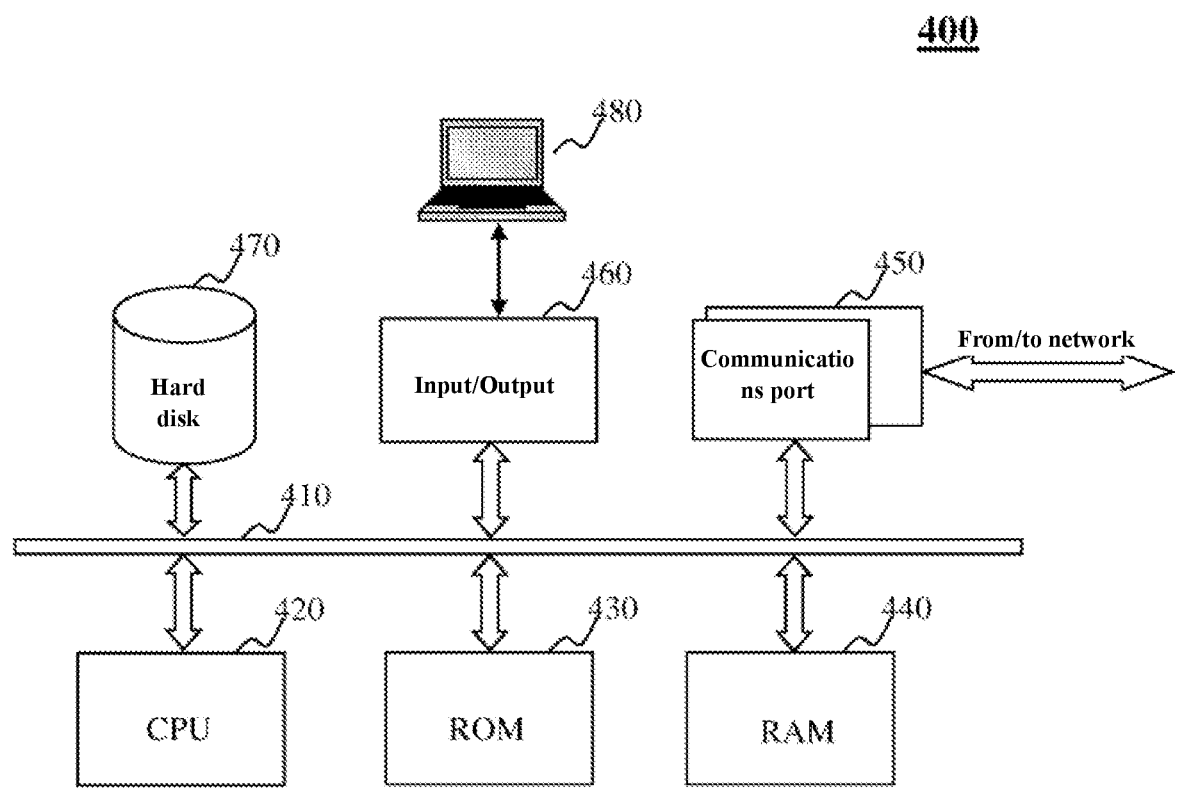
FIG. 11 is an architecture of a computing device according to at least one embodiment of the present disclosure.

The method according to the embodiments of this application may alternatively be implemented by an architecture of a computing device 400 shown in FIG. 11.

FIG. 11 is an architecture of a computing device 400 according to at least one embodiment of the present disclosure. As shown in FIG. 11, the computing device 400 may include a bus 410, one CPU 420 or at least two CPUs 420, a read-only memory (ROM) 430, a random access memory (RAM) 440, a communication port 450 connected to a network, an input/output component 460, a hard disk 470, and the like. A storage device (for example, the ROM 430 or the hard disk 470) in the computing device 400 may store an instruction and various related data or files corresponding to the dance segment recognition method provided in at least one embodiment of the present disclosure. The computing device 400 may further include a human-machine user interface 480. Clearly, an architecture shown in FIG. 11 is merely an example, and when different devices are implemented, according to actual requirements, one or at least two components in the computing device shown in FIG. 11 may be omitted.

For example, an apparatus or a program module for the dance segment recognition method provided in at least one embodiment of the present disclosure may be run on various operating systems (for example, the operating systems include, but are not limited to, Windows, Linux, iOS, or Android), such that the application scope of the dance segment recognition method, the dance segment recognition apparatus, and the storage medium provided in at least one embodiment of the present disclosure can be expanded.

For example, the dance segment recognition method provided in at least one embodiment of the present disclosure can reduce labour costs and hardware device costs (for example, the method may be implemented at a server without the need to use a plurality of computers).

For example, the dance segment recognition method provided in at least one embodiment of the present disclosure features quickness and can perform real-time processing on an online class video (that is, can be as quick as the video streaming of the online class). In this case, parents can watch dance segments showing their children in the class in real time.

For example, the dance segment recognition method provided in at least one embodiment of the present disclosure is on the basis of the artificial intelligence deep learning technologies and the sliding window rule and relates to a great quantity of exclusive real data sets for training. There is a strong pertinence of a model, and a recognition effect is greatly improved.

For example, the dance segment recognition method provided in at least one embodiment of the present disclosure has a strong technical scalability, and the technical framework may synchronously detect another action by accepting another newly developed action recognition interface.

Although the present disclosure is described in detail with general descriptions and specific implementations above, but on the basis of the embodiments of the present disclosure, some modifications or improvements may be made thereto, which is obvious to those skilled in the art. Therefore, these modifications or improvements made without departing from the spirit of the present disclosure shall all fall within the protection scope claimed in the present disclosure.

The descriptions above are merely example implementations of the present disclosure rather than limitation on the protection scope of the present disclosure, and the protection scope of the present disclosure shall be subject to the appended claims.

What is claimed is:

1. A dance segment recognition method, comprising:
   extracting an audio segment from a video segment;
   in response to the audio segment comprising a music segment with a time length greater than or equal to a pre-specified time length, using a video sub-segment that is included in the video segment and that corresponds to the music segment as a candidate dance segment; and
   in response to a quantity of image frames showing a dance move in a plurality of image frames of the candidate dance segment being greater than a first pre-specified threshold, determining the candidate dance segment to be a dance segment;
   further comprising:
   dividing the audio segment into a plurality of audio sub-segments; and
   in response to a first quantity of sequential audio sub-segments in the plurality of audio sub-segments all being determined to be music sub-segments, determining a combination of the first quantity of the sequential audio sub-segments to be at least a part of the music segment;
   extracting a first feature vector of each of at least some audio sub-segments in the plurality of audio sub-segments by using a first music recognition model;
   cutting each of the at least some audio sub-segments in the plurality of audio sub-segments into a second quantity of subdivided audio sub-segments, and extracting a second feature vector of each of the second quantity of subdivided audio sub-segments by using the second music recognition model;
   concatenating the first feature vector and the second quantity of second feature vectors that correspond to a same audio sub-segment to obtain a concatenated feature vector corresponding to the same audio sub-segment; and
   providing the concatenated feature vector corresponding to the same audio sub-segment to a third music recognition model to determine whether the same audio sub-segment is a music sub-segment by using the third music recognition model.

2. The dance segment recognition method according to claim 1, further comprising:
   extracting skeleton information from at least some image frames in the plurality of image frames; and obtaining, based on the skeleton information of the at least some image frames, the quantity of image frames showing a dance move from the at least some image frames.

3. The dance segment recognition method according to claim 2, wherein the obtaining, based on the skeleton information of the at least some image frames, the quantity of image frames showing the dance move in the at least some image frames comprises:
  in response to a variation range of a leg bone in two sequential image frames in the at least some image frames exceeding a pre-specified variation threshold, determining at least one image frame in the two sequential image frames to be an image showing the dance move.

4. The dance segment recognition method according to claim 1, further comprising:
  obtaining the quantity of image frames showing a human who is standing in the at least some image frames in the plurality of image frames; and
  using the quantity of image frames showing the human who is standing in the at least some image frames as the quantity of image frames showing the dance move in the at least some image frames.

5. The dance segment recognition method according to claim 1, wherein each of the plurality of image frames comprises an information display area and a video display area for an object; and
  the in response to the quantity of image frames showing the dance move in the plurality of image frames being greater than the first pre-specified threshold, determining the candidate dance segment to be the dance segment comprising:
  in response to the quantity of image frames comprising the information display area of a dance image in the plurality of image frames being greater than the first pre-specified threshold, determining the candidate dance segment to be the dance segment.

6. The dance segment recognition method according to claim 1, further comprising:
  in response to the quantity of image frames showing the dance move in some of the plurality of image frames being greater than the first pre-specified threshold, stopping detection on the candidate dance segment.

7. The dance segment recognition method according to claim 1, wherein the first quantity is an integer not less than 3.

8. The dance segment recognition method according to claim 7, wherein the first music recognition model is a first neural network and is configured to output the first feature vector;
  the second music recognition model is a second neural network and is configured to output the second feature vector; and
  the third music recognition model is configured to receive the concatenated feature vector.

9. The dance segment recognition method according to claim 1, wherein a product of a dimension of the second feature vector and the second quantity is equal to a dimension of the first feature vector; and
  a dimension of the concatenated feature vector is two times the dimension of the first feature vector.

10. The dance segment recognition method according to claim 1, comprising:
  using a first set of audio segments to train a first neural network, and using the trained first neural network as the first music recognition model;
  using a second set of audio segments to train the second neural network, and using the trained second neural network as the second music recognition model; and
  training a third neural network based on a third set of audio segments, the first music recognition model, and the second music recognition model, and using the trained third neural network as the third music recognition model, wherein
  the time length of each audio segment in the first set of audio segments and the third set of audio segments is a first time length, the time length of each audio segment in the second set of audio segments is a second time length, and the second time length is less than the first time length.

11. The dance segment recognition method according to claim 10, wherein the training the third neural network based on the third set of audio segments, the first music recognition model, and the second music recognition model comprises:
  extracting a first training feature vector of each audio segment in the third set of audio segments based on the first music recognition model;
  dividing each audio segment in the third set of audio segments into a pre-specified quantity of audio sub-segments;
  extracting a second training feature vector of each of the pre-specified quantity of the audio sub-segments based on the second music recognition model;
  concatenating the first training feature vector and the second training feature vector to obtain a concatenated training feature vector; and
  providing the concatenated training feature vector to the third neural network, and adjusting a parameter of the third neural network based on an output value of the third neural network to minimize a loss function.

12. The dance segment recognition method according to claim 11, wherein the providing the concatenated training feature vector to the third neural network, and adjusting the parameter of the third neural network based on the output value of the third neural network to minimize the loss function comprises:
  providing the concatenated training feature vector to the third neural network; and
  adjusting the parameter of the third neural network based on the output value of the third neural network to minimize the loss function.

13. The dance segment recognition method according to claim 1, further comprising:
  obtaining an audio positive sample and an audio negative sample; and
  creating a first set of audio segments, a second set of audio segments, and a third set of audio segments based on at least a part of the audio positive sample and at least a part of the audio negative sample.

14. The dance segment recognition method according to claim 13, wherein the obtaining the audio positive sample and the audio negative sample comprises:
  finding out a candidate positive sample and a candidate negative sample in a plurality of sample audio segments by using a fourth music recognition model; and
  using at least a part of the candidate positive sample as at least the part of the audio positive sample, and using at least a part of the candidate negative sample as at least the part of the audio negative sample.

15. The dance segment recognition method according to claim 14, wherein the obtaining the audio positive sample and the audio negative sample further comprises:

using a positive sample and a negative sample that are calibrated by man as at least the part of the obtained audio positive sample and at least the part of the obtained audio negative sample respectively.

16. The dance segment recognition method according to claim 13, wherein the obtaining the audio positive sample and the audio negative sample further comprises:
using an electronic noise segment as at least the part of the audio negative sample.

17. A non-transitory computer readable storage medium, wherein the non-transitory computer readable storage medium stores a computer program instruction, and when the computer program instruction is executed by a processor, a computer is enabled to perform following method, comprising:
extracting an audio segment from a video segment;
in response to the audio segment comprising a music segment with a time length greater than or equal to a pre-specified time length, using a video sub-segment that is included in the video segment and that corresponds to the music segment as a candidate dance segment; and
in response to a quantity of image frames showing a dance move in a plurality of image frames of the candidate dance segment being greater than a first pre-specified threshold, determining the candidate dance segment to be a dance segment;
the method further comprising:
dividing the audio segment into a plurality of audio sub-segments; and
in response to a first quantity of sequential audio sub-segments in the plurality of audio sub-segments all being determined to be music sub-segments, determining a combination of the first quantity of the sequential audio sub-segments to be at least a part of the music segment;
extracting a first feature vector of each of at least some audio sub-segments in the plurality of audio sub-segments by using a first music recognition model;
cutting each of the at least some audio sub-segments in the plurality of audio sub-segments into a second quantity of subdivided audio sub-segments, and extracting a second feature vector of each of the second quantity of subdivided audio sub-segments by using the second music recognition model;
concatenating the first feature vector and the second quantity of second feature vectors that correspond to a same audio sub-segment to obtain a concatenated feature vector corresponding to the same audio sub-segment; and
providing the concatenated feature vector corresponding to the same audio sub-segment to a third music recognition model to determine whether the same audio sub-segment is a music sub-segment by using the third music recognition model.

18. A dance segment recognition apparatus, comprising:
a processor and a memory,
wherein the memory stores a computer program instruction adaptable to be executed by the processor, and when the computer program instruction is executed by the processor, the processor is enabled to perform following method:
extracting an audio segment from a video segment;
in response to the audio segment comprising a music segment with a time length greater than or equal to a pre-specified time length, using a video sub-segment that is included in the video segment and that corresponds to the music segment as a candidate dance segment; and
in response to a quantity of image frames showing a dance move in a plurality of image frames of the candidate dance segment being greater than a first pre-specified threshold, determining the candidate dance segment to be a dance segment;
the method further comprising:
dividing the audio segment into a plurality of audio sub-segments; and
in response to a first quantity of sequential audio sub-segments in the plurality of audio sub-segments all being determined to be music sub-segments, determining a combination of the first quantity of the sequential audio sub-segments to be at least a part of the music segment;
extracting a first feature vector of each of at least some audio sub-segments in the plurality of audio sub-segments by using a first music recognition model;
cutting each of the at least some audio sub-segments in the plurality of audio sub-segments into a second quantity of subdivided audio sub-segments, and extracting a second feature vector of each of the second quantity of subdivided audio sub-segments by using the second music recognition model;
concatenating the first feature vector and the second quantity of second feature vectors that correspond to a same audio sub-segment to obtain a concatenated feature vector corresponding to the same audio sub-segment; and
providing the concatenated feature vector corresponding to the same audio sub-segment to a third music recognition model to determine whether the same audio sub-segment is a music sub-segment by using the third music recognition model.

* * * * *